US 9,459,744 B2

(12) United States Patent
Hirata et al.

(10) Patent No.: US 9,459,744 B2
(45) Date of Patent: Oct. 4, 2016

(54) TOUCH PANEL SUBSTRATE AND DISPLAY DEVICE

(71) Applicant: Sharp Kabushiki Kaisha, Osaka-shi, Osaka (JP)

(72) Inventors: Mitsuaki Hirata, Osaka (JP); Shinji Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/417,230

(22) PCT Filed: Jul. 24, 2013

(86) PCT No.: PCT/JP2013/070052
§ 371 (c)(1),
(2) Date: Jan. 26, 2015

(87) PCT Pub. No.: WO2014/021168
PCT Pub. Date: Feb. 6, 2014

(65) Prior Publication Data
US 2015/0212622 A1    Jul. 30, 2015

(30) Foreign Application Priority Data
Jul. 31, 2012   (JP) .................................. 2012-170472

(51) Int. Cl.
G06F 3/044    (2006.01)
G06F 1/16     (2006.01)
G06F 3/041    (2006.01)

(52) U.S. Cl.
CPC .................. *G06F 3/044* (2013.01); *G06F 1/16* (2013.01); *G06F 3/0412* (2013.01); *G06F 2203/04111* (2013.01); *G06F 2203/04112* (2013.01)

(58) Field of Classification Search
CPC ........ G06F 3/044; G06F 3/0412; G06F 1/16; G06F 2203/04112; G06F 2203/04111
See application file for complete search history.

(56) References Cited

U.S. PATENT DOCUMENTS

| 7,202,859 | B1 * | 4/2007 | Speck ..................... G06F 3/044 345/173 |
| D679,100 | S  * | 4/2013 | Kuriki .............. D5/63 |
| D685,196 | S  * | 7/2013 | Kuriki .............. D5/63 |
| 8,711,105 | B2 * | 4/2014 | Gray ...................... G06F 3/044 345/173 |
| 9,081,453 | B2 * | 7/2015 | Bulea ..................... G06F 3/044 |
| 9,146,632 | B2 * | 9/2015 | Miyamoto ............. G06F 3/044 |
| 9,146,644 | B2 * | 9/2015 | Hershman ............... G06F 3/044 |

(Continued)

FOREIGN PATENT DOCUMENTS

| JP | 2010-039537 A | 2/2010 |
| JP | 2011-129501 A | 6/2011 |

(Continued)

*Primary Examiner* — Christopher E Leiby
(74) *Attorney, Agent, or Firm* — Keating & Bennett, LLP

(57) ABSTRACT

A touch panel substrate used for a touch panel with enhanced display quality is realized. A touch panel substrate (2) in accordance with one aspect of the invention includes a first detection electrode (11) including a plurality of first lattice electrodes (13) aligned in a lateral direction. Each of the plurality of first lattice electrodes (13) includes conductive lines (17a) and second conductive lines (17b). The conductive lines (17a) and the second conductive lines (17b) form a lattice. The conductive lines (17a) are inclined by an angle α ($0°<α<45°$) in a lateral direction. A pitch of conductive lines (21) of a connecting section (16) which are parallel to the conductive lines (17a) is smaller than a pitch of the conductive lines (17a).

14 Claims, 18 Drawing Sheets

(56) References Cited

U.S. PATENT DOCUMENTS

| | | | |
|---|---|---|---|
| 9,261,997 B2* | 2/2016 | Chang | G06F 3/0412 |
| 2004/0239650 A1* | 12/2004 | Mackey | G06F 3/044 |
| | | | 345/174 |
| 2005/0030048 A1* | 2/2005 | Bolender | G06F 3/0202 |
| | | | 324/661 |
| 2008/0138589 A1* | 6/2008 | Wakabayashi | G06F 3/044 |
| | | | 428/195.1 |
| 2009/0002337 A1* | 1/2009 | Chang | G06F 3/044 |
| | | | 345/174 |
| 2011/0102370 A1* | 5/2011 | Kono | G06F 3/044 |
| | | | 345/174 |
| 2011/0141037 A1* | 6/2011 | Hwang | G06F 3/044 |
| | | | 345/173 |
| 2011/0290631 A1* | 12/2011 | Kuriki | G06F 3/044 |
| | | | 200/600 |
| 2011/0291966 A1* | 12/2011 | Takao | G06F 3/044 |
| | | | 345/173 |
| 2012/0118614 A1 | 5/2012 | Kuriki | |
| 2012/0212449 A1 | 8/2012 | Kuriki | |
| 2012/0312677 A1* | 12/2012 | Kuriki | G06F 3/044 |
| | | | 200/600 |
| 2014/0299361 A1* | 10/2014 | Nakamura | G06F 3/044 |
| | | | 174/253 |

FOREIGN PATENT DOCUMENTS

| | | | | |
|---|---|---|---|---|
| JP | 2011-175412 A | | 9/2011 | |
| JP | 2012014642 A | * | 1/2012 | |
| JP | 2012033147 A | * | 2/2012 | |
| JP | 2012103761 A | * | 5/2012 | |
| JP | WO 2012060344 A1 | * | 5/2012 | G06F 3/041 |
| JP | 2012163933 A | * | 8/2012 | |
| JP | 2012163951 A | * | 8/2012 | |
| JP | 2012164648 A | * | 8/2012 | |

* cited by examiner

F I G. 1 7
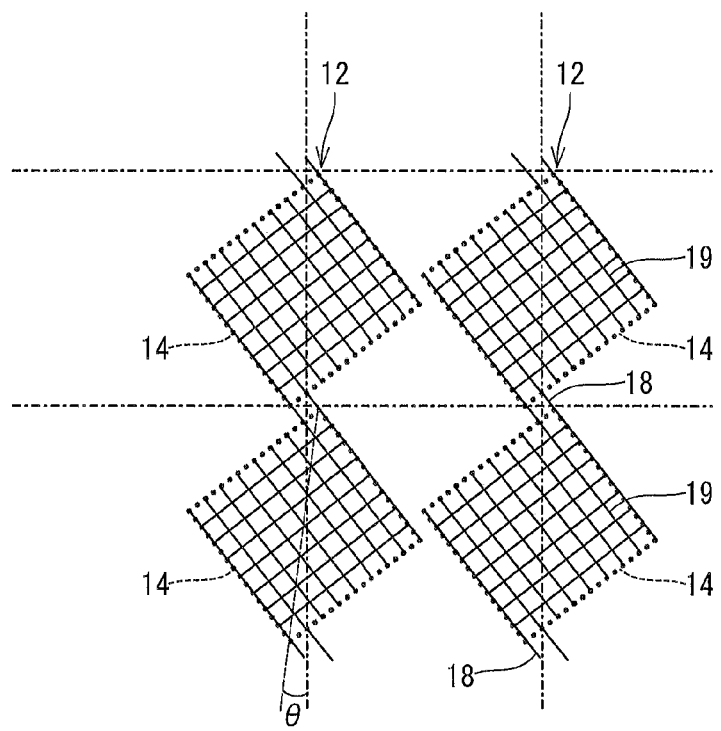

F I G. 1 8
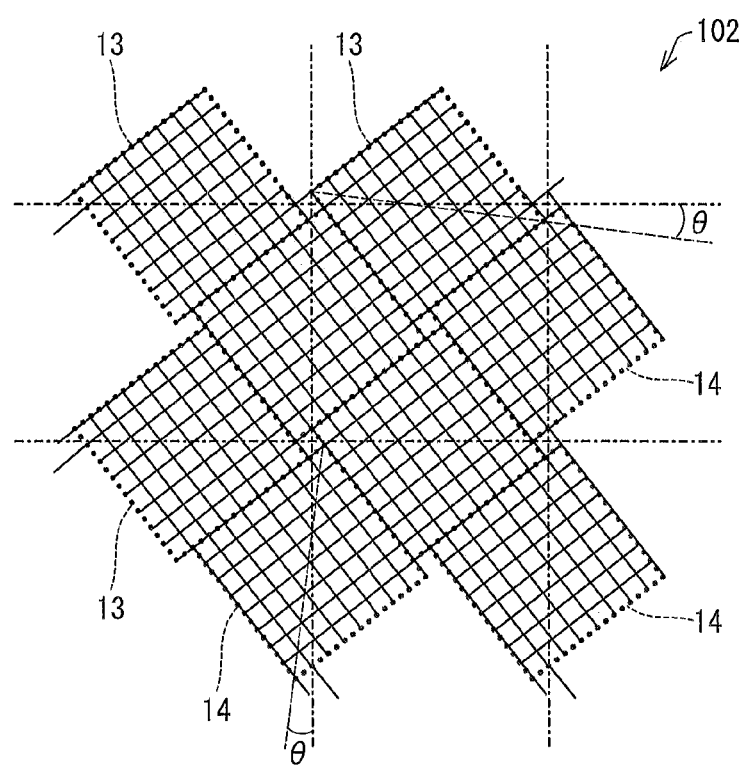

TOUCH PANEL SUBSTRATE AND DISPLAY DEVICE

TECHNICAL FIELD

The present invention relates to a touch panel substrate and a display device including the touch panel substrate.

BACKGROUND ART

Display devices each including a display section and an input section which are integrated with each other in order to downsize the devices have been recently widespread. Particularly for portable terminals such as mobile phones, PDAs (Personal Digital Assistants), and notebook personal computers, there are widely employed display devices each including a touch panel which, when a finger or a stylus (detection target) touches a surface of a display, is capable of detecting a position where the finger or the stylus touches.

Touch panels of various types such as a so-called resistive film (pressure-sensitive) type and a capacitive type are conventionally known. Among them, capacitive touch panels are widely employed.

In the capacitive touch panels, a position where a finger or a stylus touches is detected by detecting a change in capacitance when the finger or the stylus touches a display screen. This allows detecting, with a simple operation, the position where the finger or the stylus touches.

In many cases, so-called sensor electrodes which are position detecting electrodes for detecting a position where an object touches are made of, for example, ITO (indium tin oxide). However, in a case of a touch panel having a large screen, a sensor electrode made of ITO has large resistance, so that detection sensitivity unfortunately drops.

Patent Literatures 1 and 2 each describe a configuration in which a sensor electrode is constituted by lattice-shaped metal wires so as to reduce resistance of the sensor electrode. In order that sensor electrodes extending in a longitudinal direction and sensor electrodes extending in a lateral direction do not overlap each other, the sensor electrodes are each constituted by a plurality of lattice electrodes each defined to have a square shape.

CITATION LIST

Patent Literatures

[Patent Literature 1]
Japanese Patent Application Publication No. 2011-129501 (Jun. 30, 2011)
[Patent Literature 2]
Japanese Patent Application Publication No. 2010-039537 (Feb. 18, 2010)
[Patent Literature 3]
Japanese Patent Application Publication No. 2011-175412 (Sep. 8, 2011)

SUMMARY OF INVENTION

Technical Problem

However, in the above conventional configuration, lattice-shaped metal wires and a black matrix of a display panel may interfere with each other to cause moiré, so that display quality may deteriorate.

Occurrence of moiré is related to pitches of wires in a touch panel and a pitch of pixels (pitch of a black matrix) in longitudinal and lateral directions. The pitch of the black matrix is determined by, for example, a size of a display panel and an arrangement of pixels. Occurrence of moiré is also related to a pitch of intersections of wires in the touch panel and a pitch of a regular structure (e.g. TFT, prism of a light guide plate) of the display panel.

Furthermore, a pitch of sensor electrodes arranged longitudinally and laterally on the touch panel is determined as a specification based on the size of the display panel and required performance (resolution). When the pitch of the sensor electrodes is determined, a size of a shape of each of lattice electrodes included in the sensor electrode is limited. A pitch of lattices (pitch of wires) is obtained by dividing a length of one side of the lattice electrode by the number by which one side of a lattice of the lattice electrode is divided. However, there is a preferable range of the number of wires in the lattice in view of, for example, performance (detection sensitivity) and an open area ratio. Accordingly, a designer cannot necessarily determine the pitch of wires without any limitation. Consequently, moiré may occur in the conventional configuration.

The present invention was made in view of the foregoing problem. With one aspect of the present invention, it is possible to realize (i) a touch panel substrate used in a touch panel with improved display quality and (ii) a display device including the touch panel substrate.

Solution to Problem

A touch panel substrate of the present invention includes:

a first detection electrode including a plurality of first lattice electrodes aligned in a first direction; and a second detection electrode including a plurality of second lattice electrodes aligned in a second direction different from the first direction, in a plan view, the plurality of first lattice electrodes being provided in regions different from regions where the plurality of second lattice electrodes are provided, the plurality of first lattice electrodes each including a plurality of first conductive lines parallel to a third direction and a plurality of second conductive lines parallel to a fourth direction different from the third direction, the plurality of first conductive lines and the plurality of second conductive lines forming a lattice, the third direction being inclined to the first direction at an angle of α that is larger than 0° and smaller than 45°, the plurality of second lattice electrodes each including a plurality of third conductive lines parallel to the third direction and a plurality of fourth conductive lines parallel to the fourth direction, the plurality of third conductive lines and the plurality of fourth conductive lines forming a lattice, adjacent ones of the plurality of first lattice electrodes in the first direction being electrically connected with each other via a first connecting section positioned between the adjacent ones of the plurality of first lattice electrodes, the first connecting section including a plurality of fifth conductive lines parallel to the third direction, the plurality of fifth conductive lines having a pitch that is smaller than a pitch of the plurality of first conductive lines, adjacent ones of the plurality of second lattice electrodes in the second direction being electrically connected with each other via a second connecting section positioned between the adjacent ones of the plurality of second lattice electrodes, the second connecting section including a plurality of sixth conductive lines parallel to the fourth direction, and the plurality of sixth conductive lines having a pitch that is smaller than a pitch of the plurality of fourth conductive lines.

Advantageous Effects of Invention

A touch panel substrate of the present invention includes:

first detection electrodes each including a plurality of first lattice electrodes aligned in a first direction; and second detection electrodes each including a plurality of second lattice electrodes aligned in a second direction different from the first direction, in a plan view, the plurality of first lattice electrodes being provided in regions different from regions where the plurality of second lattice electrodes are provided, the plurality of first lattice electrodes each including a plurality of first conductive lines parallel to a third direction and a plurality of second conductive lines parallel to a fourth direction different from the third direction, the plurality of first conductive lines and the plurality of second conductive lines forming a lattice, the third direction being inclined to the first direction at an angle of α that is larger than 0° and smaller than 45°, the plurality of second lattice electrodes each including a plurality of third conductive lines parallel to the third direction and a plurality of fourth conductive lines parallel to the fourth direction, the plurality of third conductive lines and the plurality of fourth conductive lines forming a lattice, adjacent ones of the plurality of first lattice electrodes in the first direction being electrically connected with each other via a first connecting section positioned between the adjacent ones of the plurality of first lattice electrodes, the first connecting section including a plurality of fifth conductive lines parallel to the third direction, the plurality of fifth conductive lines having a pitch that is smaller than a pitch of the plurality of first conductive lines, adjacent ones of the plurality of second lattice electrodes in the second direction being electrically connected with each other via a second connecting section positioned between the adjacent ones of the plurality of second lattice electrodes, the second connecting section including a plurality of sixth conductive lines parallel to the fourth direction, and the plurality of sixth conductive lines having a pitch that is smaller than a pitch of the plurality of fourth conductive lines. Accordingly, the touch panel substrate of the present invention can subdue occurrence of moiré so as to enhance display quality and can appropriately detect a position where a target object touches.

BRIEF DESCRIPTION OF DRAWINGS

FIG. 17 is a plan view illustrating a detailed configuration of the second detection electrodes.

FIG. 18 is a view obtained by overlapping the first detection electrodes in FIG. 16 and the second detection electrodes in FIG. 17, and is a plan view illustrating a configuration of wires of the touch panel substrate.

DESCRIPTION OF EMBODIMENTS

First Embodiment

The following description will discuss a display device having a touch panel function in accordance with one embodiment of the present invention (hereinafter referred to as a display device).

(Configuration of Display Device)

Figure 1:
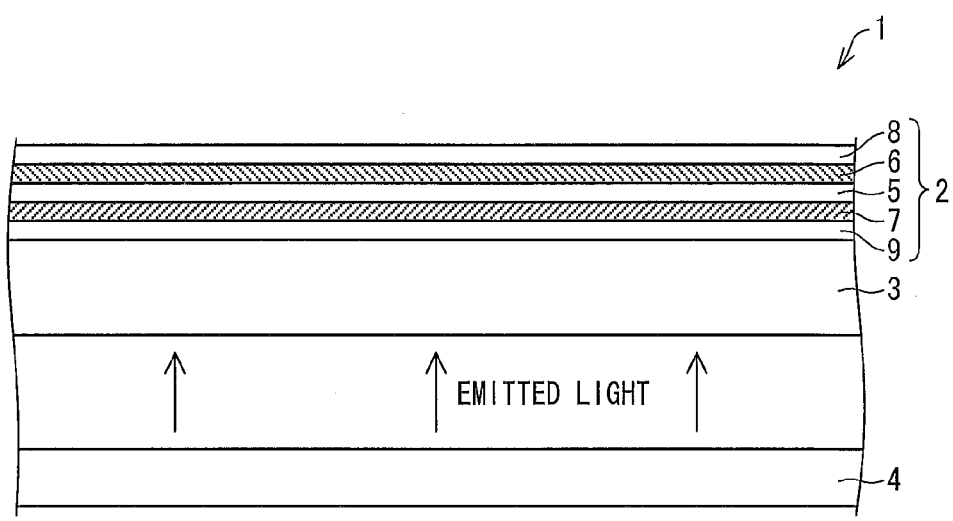
FIG. 1 is a cross sectional view schematically illustrating a configuration of a display device in accordance with one embodiment of the present invention.

FIG. 1 is a cross sectional view schematically illustrating a configuration of a display device in accordance with the present embodiment. A display device 1 illustrated in FIG. 1 includes a touch panel substrate 2, a display panel 3, various driving circuits for driving the display panel 3 (e.g., a data signal line driving circuit and a scanning signal line driving circuit; not illustrated), and a backlight 4.

The display panel 3 is an active matrix liquid crystal display panel in which a liquid crystal layer is sandwiched between an active matrix substrate and a color filter substrate. The display panel 3 includes a black matrix (not illustrated) which separates pixels in a lattice pattern. Since the display panel 3 may be a general one, a detailed description of a structure of the display panel 3 is omitted here. The display panel 3 is not limited to a liquid crystal display panel, and may be any display panel such as an organic EL display.

The backlight 4 is provided on a back side of the display panel 3 and emits light to the display panel 3.

The touch panel substrate 2 is a capacitive touch panel substrate provided on a front side (user side) of the display panel 3. The touch panel substrate 2 includes a substrate 5, a first electrode layer 6, a second electrode layer 7, a first protective layer 8, and a second protective layer 9. The first electrode layer 6 is provided on a front side of the substrate 5, and the second electrode layer 7 is provided on a back side of the substrate 5. The first protective layer 8 is provided on a front side of the first electrode layer 6. The second protective layer 9 is provided on a back side of the second electrode 7.

The substrate 5 is made of a dielectric material, and can be made of, for example, glass, a plastic film or the like.

The first electrode layer 6 is provided with a plurality of first detection electrodes made of a conductive line with a low resistance, such as a metal. The plurality of first detection electrodes extend in a direction in which scanning signal lines extend (lateral direction: first direction).

The second electrode layer 7 is provided with a plurality of second detection electrodes made of a conductive line with a low resistance, such as a metal. The plurality of second detection electrodes extend in a direction orthogonal to the direction in which the first detection electrodes extend (direction in which data signal lines extend: longitudinal direction, second direction).

The first protective layer 8 is a plane which a detection target touches, and may be made of a transparent insulating material such as glass and a plastic film. Similarly, the second protective layer 9 may be made of a transparent insulating material such as glass and a plastic film. The second protective layer 9 is attached to the display panel 3.

Capacitance is defined between a first detection electrode and a second detection electrode. The capacitance changes when a detection target touches a surface of the touch panel substrate 2. By detecting a change in the capacitance, it is possible to specify a position where the detection target touches. For example, by applying a driving voltage to the first detection electrodes and measuring a change in a voltage of the second detection electrodes, it is possible to specify the first detection electrode (row) and the second detection electrode (column) between which the capacitance changes. In this case, the first detection electrode and the second detection electrode may be referred to as a transmission electrode and a reception electrode, respectively. A position detection circuit for detecting a coordinate position of the detection target may be a well-known circuit and is not particularly limited.

In a case where the detection electrodes extending in a longitudinal direction and a lateral direction are made of light-shielding lattice-shaped metal wires, moiré easily occurs when the lattice-shaped metal wires are positioned at angles of 0° and 90° with respect to the scanning signal lines. When the lattice-shaped metal wires are positioned at an angle of 45° with respect to the scanning signal lines, moiré is still highly likely to occur, although moiré is less likely to occur than in the cases of 0° and 90°.

A possible way to prevent moiré is slightly inclining lattice-shaped metal wires from an inclination of 45° to the scanning signal lines.

It is preferable that the lateral detection electrodes extend along the scanning signal lines and that the longitudinal detection electrodes extend perpendicularly to the scanning signal lines. This is because an inclination of the direction in which the detection electrodes extend makes it impossible to appropriately detect a position where a detection target touches. Accordingly, inclining the lattice-shaped metal wires from an inclination of 45° should not be attained by inclining the touch panel substrate together with the detection electrodes with respect to the display panel.

The following explains a referential example in which the lattice-shaped metal wires are slightly inclined from an inclination of 45° to the scanning signal lines while the detection electrodes continue to extend so as to be parallel or perpendicular to the scanning signal lines.

Referential Example

Figure 15:
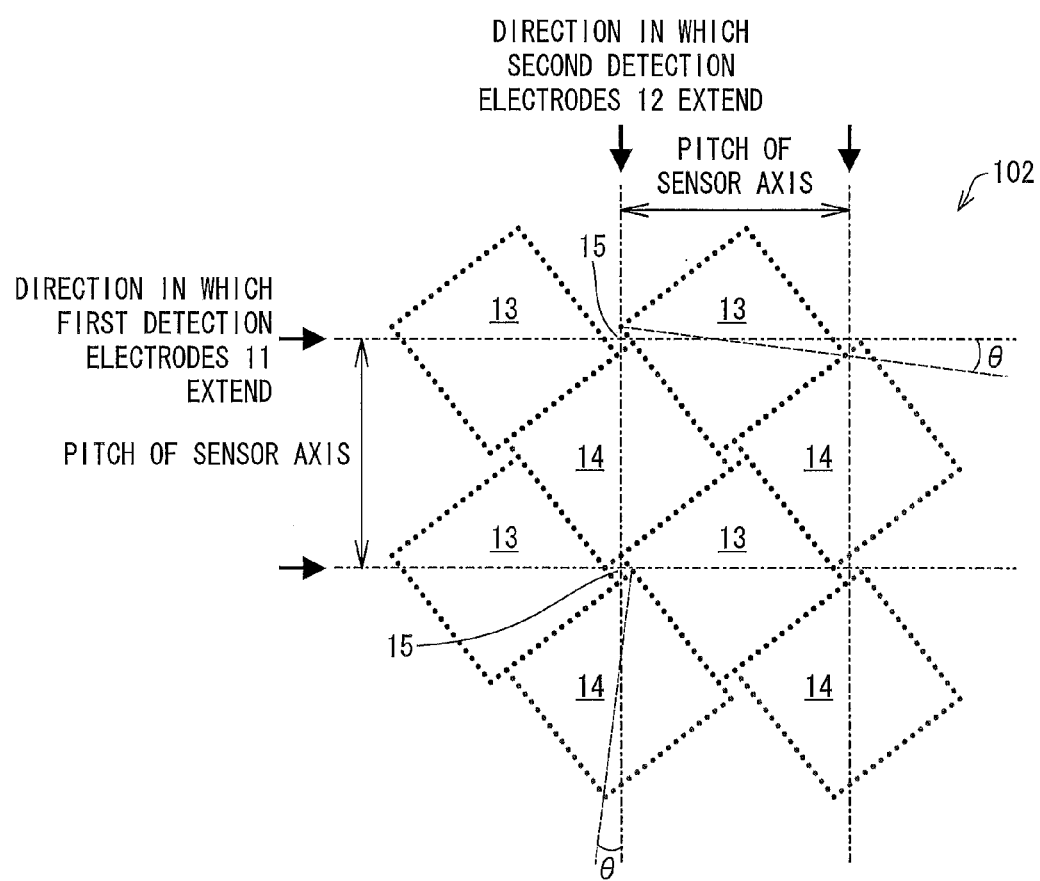
FIG. 15 is a plan view illustrating positions of first detection electrodes and second detection electrodes in a touch panel substrate in accordance with a referential example.

FIG. 15 is a plan view illustrating positions of first detection electrodes 11 and second detection electrodes 12 in a touch panel substrate 102 in accordance with the Referential Example. The touch panel substrate 102 is provided with a plurality of first lattice electrodes 13 each having a square shape and a plurality of second lattice electrodes 14 each having a square shape. It should be noted that squares indicating shapes of the plurality of first lattice electrodes 13 and shapes of the plurality of second lattice electrodes 14 (regions where the plurality of first lattice electrodes 13 and the plurality of second lattice electrodes 14 are provided) are inclined uniformly. The plurality of first lattice electrodes 13 are provided in a layer different from a layer where the plurality of second lattice electrodes 14 are provided.

The plurality of first lattice electrodes 13 and the plurality of second lattice electrodes 14 are each made of conductive lines provided to form a lattice having a square shape. Consequently, light emitted from the display panel can pass through the touch panel substrate 102.

A pitch of the first detection electrodes 11 and a pitch of the second detection electrodes 12 are identical to each other. This allows a position where a detection target touches to be detected with the same accuracy both in a longitudinal direction and a lateral direction. The pitch of the first detection electrodes 11 and the pitch of the second detection electrodes 12 are determined as specifications in accordance with required performance (detection accuracy, detection resolution). The first lattice electrodes 13 are positioned to be spaced from each other. The second lattice electrodes 14 are positioned to be spaced from each other.

Although FIG. 15 does not illustrate detailed configurations of the first lattice electrodes 13 and the second lattice electrodes 14, plural ones of the first lattice electrodes 13 which ones are positioned to be spaced from each other in a lateral direction are electrically connected with each other via a connecting section provided at a square region 15 between the plural ones of the first lattice electrodes 13. The first detection electrodes 11 are each provided with plural ones of the first lattice electrodes 13 which ones are aligned in a lateral direction. Plural ones of the first detection electrodes 11 extending in a lateral direction are aligned in a longitudinal direction.

Plural ones of the second lattice electrodes 14 which ones are positioned to be spaced from each other in a longitudinal direction are electrically connected with each other via another connecting section provided at the square region 15 between the plural ones of the second lattice electrodes 14. The second detection electrodes 12 are each provided with plural ones of the second lattice electrodes 14 which ones are aligned in a longitudinal direction. Plural ones of the second detection electrodes 12 extending in a longitudinal direction are aligned in a lateral direction.

A diagonal of each of the first lattice electrodes 13 (a diagonal connecting two opposing corners of that first lattice electrode 13 which are adjacent to the region 15) is inclined at an angle θ to the direction in which the first detection electrodes 11 extend (lateral direction). It should be noted that the first lattice electrodes 13 are aligned in the direction in which the first detection electrodes 11 extend. Similarly, a diagonal of each of the second lattice electrodes 14 (a diagonal connecting two opposing corners of that second lattice electrode 14 which are adjacent to the region 15) is inclined at an angle θ to the direction in which the second detection electrodes 12 extend (longitudinal direction). It should be noted that the second lattice electrodes 14 are aligned in the direction in which the second detection electrodes 12 extend.

Figure 16:
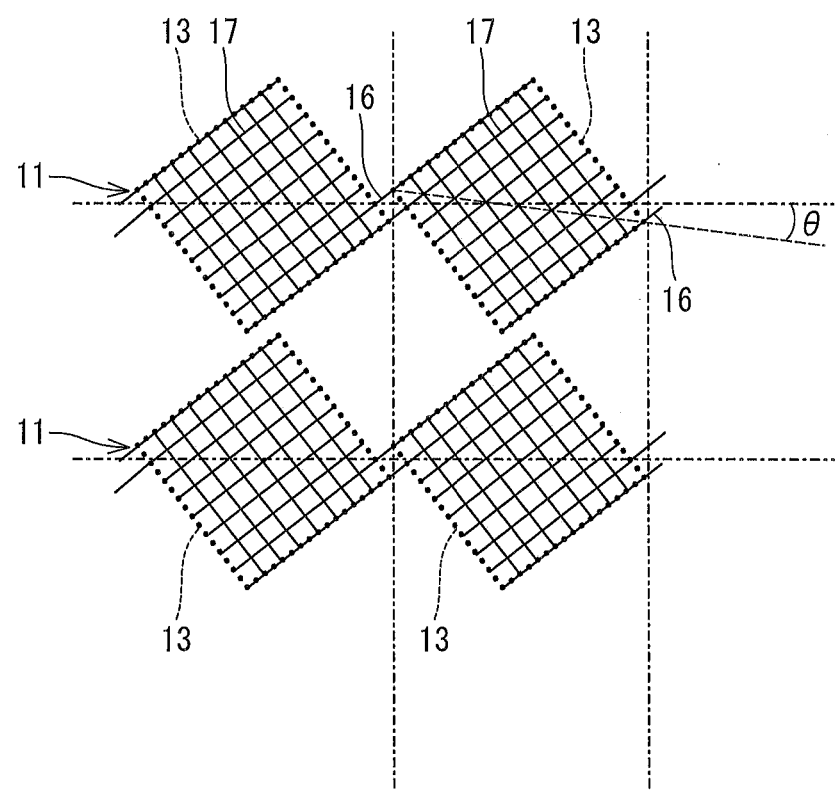
FIG. 16 is a plan view illustrating a detailed configuration of the first detection electrodes.

FIG. 16 is a plan view illustrating a detailed configuration of the first detection electrodes 11. In FIG. 16, a shape of each of the first lattice electrodes 13 is indicated by a dotted line, and a conductive line (first conductive line) 17 constituting each of the first lattice electrodes 13 is indicated by a solid line.

The first detection electrodes 11 extend in a lateral direction, and are each provided with plural ones of the first lattice electrodes 13. Adjacent ones of the first lattice electrodes 13 in a lateral direction are spaced from each other with a connecting section 16 made of a conductive line therebetween. The adjacent ones of the first lattice electrodes 13 are connected via the connecting section 16. It should be noted that adjacent ones of the first lattice electrodes 13 in a longitudinal direction are disconnected from each other. The first lattice electrodes 13 and the connecting section 16 are provided in the same layer (first electrode layer 6 in FIG. 1).

The conductive lines 17 in the first lattice electrode 13 are formed to have a lattice shape which is along and parallel to the shape of the first lattice electrode 13. Specifically, the lattice of the conductive lines 17 is formed in such a manner that the conductive lines 17 are each parallel to a side of the shape (square) of the first lattice electrode 13. Here, since the first lattice electrode 13 has a square shape, the conductive lines (lattice wires) 17 constituting the first lattice electrode 13 are provided to form a square lattice shape.

The conductive lines 17 and the connecting section 16 are made of, for example, a metal with low resistance. Here, a conductive line of the connecting section 16 is provided at a position to which a part of the conductive lines (lattice wires) 17 forming the lattice shape is extended.

A diagonal of each of the first lattice electrodes 13 (a diagonal connecting two opposing corners of that first lattice electrode 13 which are adjacent to the connecting section 16) is inclined at the angle θ to the direction in which the first detection electrodes 11 extend (lateral direction). Specifically, a diagonal of a unit lattice (quadrangle as a minimum unit) of the lattice constituting each of the first lattice electrodes 13 is inclined at the angle θ to the direction in which the first detection electrodes 11 extend (lateral direction). It should be noted that the first lattice electrodes 13 are aligned in the direction in which the first detection electrodes 11 extend.

FIG. 17 is a plan view illustrating a detailed configuration of the second detection electrodes 12. In FIG. 17, a shape of each of the second lattice electrodes 14 is indicated by a dotted line, and a conductive line (second conductive line) 19 constituting each of the second lattice electrodes 14 is indicated by a solid line. The second electrodes 12 have a configuration in which the first detection electrodes 11 are rotated by 90°.

The second detection electrodes 12 extend in a longitudinal direction, and are each provided with plural ones of the second lattice electrodes 14. Adjacent ones of the second lattice electrodes 14 in a longitudinal direction are spaced from each other with a connecting section 18 made of a conductive line therebetween. The adjacent ones of the second lattice electrodes 14 are connected via the connecting section 18. It should be noted that adjacent ones of the second lattice electrodes 14 in a lateral direction are disconnected from each other. The second lattice electrodes 14 and the connecting section 18 are provided in the same layer (second electrode layer 7 in FIG. 1).

The conductive lines 19 in the second lattice electrode 14 are formed to have a lattice shape which is along and parallel to the shape of the second lattice electrode 14. Specifically, the lattice of the conductive lines 19 is formed in such a manner that each of the conductive lines 19 is parallel to a side of the shape (square) of the second lattice electrode 14. Here, since the second lattice electrode 14 has a square shape, the conductive lines (lattice wires) 19 constituting the second lattice electrode 14 are provided to form a square lattice shape.

The conductive lines 19 and the connecting section 18 are made of, for example, a metal with low resistance. Here, a conductive line of the connecting section 18 is provided at a position to which a part of the conductive lines (lattice wires) 19 forming the lattice shape is extended.

A diagonal of each of the second lattice electrodes 14 (a diagonal connecting two opposing corners of that second lattice electrode 14 which are adjacent to the connecting section 18) is inclined at the angle θ to the direction in which the second detection electrodes 12 extend (longitudinal direction). Specifically, a diagonal of a minimum unit lattice (quadrangle as a minimum unit) of the lattice constituting each of the second lattice electrodes 14 is inclined at the same angle θ to the direction in which the second detection electrodes 12 extend (longitudinal direction). It should be noted that the second lattice electrodes 14 are aligned in the direction in which the second detection electrodes 12 extend.

FIG. 18 is a view obtained by overlapping the first detection electrodes 11 in FIG. 16 and the second detection electrodes 12 in FIG. 17, and is a plan view illustrating a configuration of wires of the touch panel substrate 102. By overlapping the first detection electrodes 11 and the second detection electrodes 12, a uniform lattice pattern is formed on a whole of the touch panel substrate 102 (predetermined region where the detection electrodes are provided). Furthermore, the conductive lines 17 of the first detection electrode 11 and the conductive lines 19 of the second detection electrode do not overlap on the same lines. Accordingly, patterns of the first detection electrodes 11 and the second detection electrodes 12 are less likely to be seen by a user, so that display quality does not deteriorate. The direction in which the first detection electrodes 11 extend (lateral direction) and the direction in which the second detection electrodes 12 extend (longitudinal direction) are orthogonal to each other.

A lattice of a black matrix (not illustrated) provided in the display panel 3 includes (i) strips extending in one direction parallel to the direction in which the first detection electrodes 11 extend (lateral direction) and (ii) strips extending in another direction parallel to the direction in which the second detection electrodes 12 extend (longitudinal direction).

Diagonals of a unit lattice (quadrangle as a minimum unit) of the lattice constituting each of the first lattice electrodes 13 or each of the second lattice electrodes 14 are inclined with respect to both of the direction in which the first detection electrodes 11 extend (lateral direction) and the direction in which the second detection electrodes 12 extend (longitudinal direction). Furthermore, conductive lines of the lattice are also inclined with respect to both of the direction in which the first detection electrodes 11 extend (lateral direction) and the direction in which the second detection electrodes 12 extend (longitudinal direction). One of two diagonals of the lattice is inclined at the angle θ (0°<θ<45°) to one of the direction in which the first detection electrodes 11 extend (lateral direction) and the direction in which the second detection electrodes 12 extend (longitudinal direction).

Pixels of the display panel 3 are aligned in a lateral direction and a longitudinal direction. In the touch panel substrate 102, the first detection electrodes 11 extend in the lateral direction and the second detection electrodes 12 extend in the longitudinal direction. On the other hand, in the touch panel substrate 102, one of the two diagonals of the lattice is inclined at the angle θ to the direction in which the first detection electrodes 11 extend. That is, the conductive lines forming the lattice are inclined at the angle θ to an inclination of 45° to the scanning signal lines. Consequently, as compared with a conventional display device in which lattice-shaped metal wires are provided at an angle of 45° with respect to the scanning signal lines, a display device using the touch panel substrate 102 can further prevent occurrence of moiré.

This referential example is an example under conditions that (1) conductive lines forming the lattice are inclined to an inclination of 45° to the scanning signal lines, (2) adjacent ones of the first lattice electrodes 13 are connected via the connecting section 16 including two wires (that is, a width of the connecting section is equal to a width of one unit lattice) (the same applies to the second lattice electrodes 14), and (3) the first lattice electrodes 13 and the second lattice electrodes 14 form a uniform lattice of conductive lines in the touch panel substrate 102 as illustrated in FIG. 18. The condition (1) is for reducing moiré. The condition (2) is for the touch panel to operate even when a part of the wires of the connecting section is broken. The condition (3) is for making brightness of a whole display screen uniform.

In order that the touch panel substrate including lattice electrodes having a diamond shape (square shape) meets the conditions (1)-(3), it is necessary to satisfy an equation below.

$$\text{Angle of wires of lattice} = 45° \pm \arctan(1/m) \qquad (1)$$

where m represents the number by which a side of a lattice of the lattice electrode is divided and is a natural number of 2 or more. m number of unit lattices defined by lattice wires are aligned along a side of a shape of the lattice electrode. In the referential examples illustrated in, for example, FIGS. 16-18, a division number m is 8.0 in FIG. 18 corresponds to arctan(1/m). In a case where the lattice wire is inclined at arctan(1/m) to an inclination of 45°, a size of a unit lattice into which the lattice electrode is divided is equal to a size of the region 15 where the connecting section is provided (see FIG. 15). The angle of the lattice wire is an angle of the lattice wires in one direction with respect to the scanning signal lines. The lattice wires in the other direction are perpendicular to the lattice wires in one direction. The division number m falls within a range appropriate for the touch panel. For example, in a case where the division number m is increased too much, the area of wires is increased, so that transmittance of the touch panel substrate is decreased.

Problem in Referential Example

However, depending on the display panel 3 used, moiré may occur even in the touch panel substrate 102 of the Referential Example, which touch panel substrate 102 satisfies the equation (1). Moiré easily occurs particularly in a display panel including smaller picture elements.

For example, a display device was produced by overlapping the display panel 3 whose pitch of picture elements is 75 μm in a lateral direction and 225 μm in a longitudinal direction with the touch panel substrate 102 whose pitch of sensor axes in a longitudinal direction and in a lateral direction (pitch of detection electrodes) is 5 mm, and it was examined whether moiré was generated in the display device. In this examination, the touch panel substrate 102 meeting the conditions (1)-(3) and the equation (1) was prepared while changing the division number m. However, in any of the display devices produced from the combination of the display panel 3 and the touch panel substrate 102, moiré occurred. Since the division number of m is a natural number, the angle of the lattice wires which is allowable in the equation (1) takes intermittent values. This restricts the angle of the lattice wires, so that it is difficult to position the lattice wires at an angle at which moiré is less likely to occur.

Examples

In view of the above, in the touch panel substrate 2 in accordance with the present embodiment, the angle of the lattice wires is determined as follows.

$$\text{Angle of wires of lattice} = 45° \pm \arctan(1/n) \qquad (2)$$

where n is a real number and n>m. In this case, arctan(1/n)<arctan(1/m). m represents the number by which a side of a lattice of the lattice electrode is divided and is a natural number of 2 or more. That is, in the present embodiment, the angle of the lattice wires is closer to 45° than that of the Referential Example, provided that the division number m is the same between the present embodiment and the Referential Example. In a case where n≠m, a size of a square region at a gap between the first lattice electrode and the second lattice electrode is different from a size of a unit lattice which size is determined by the division number m.

Figure 2:
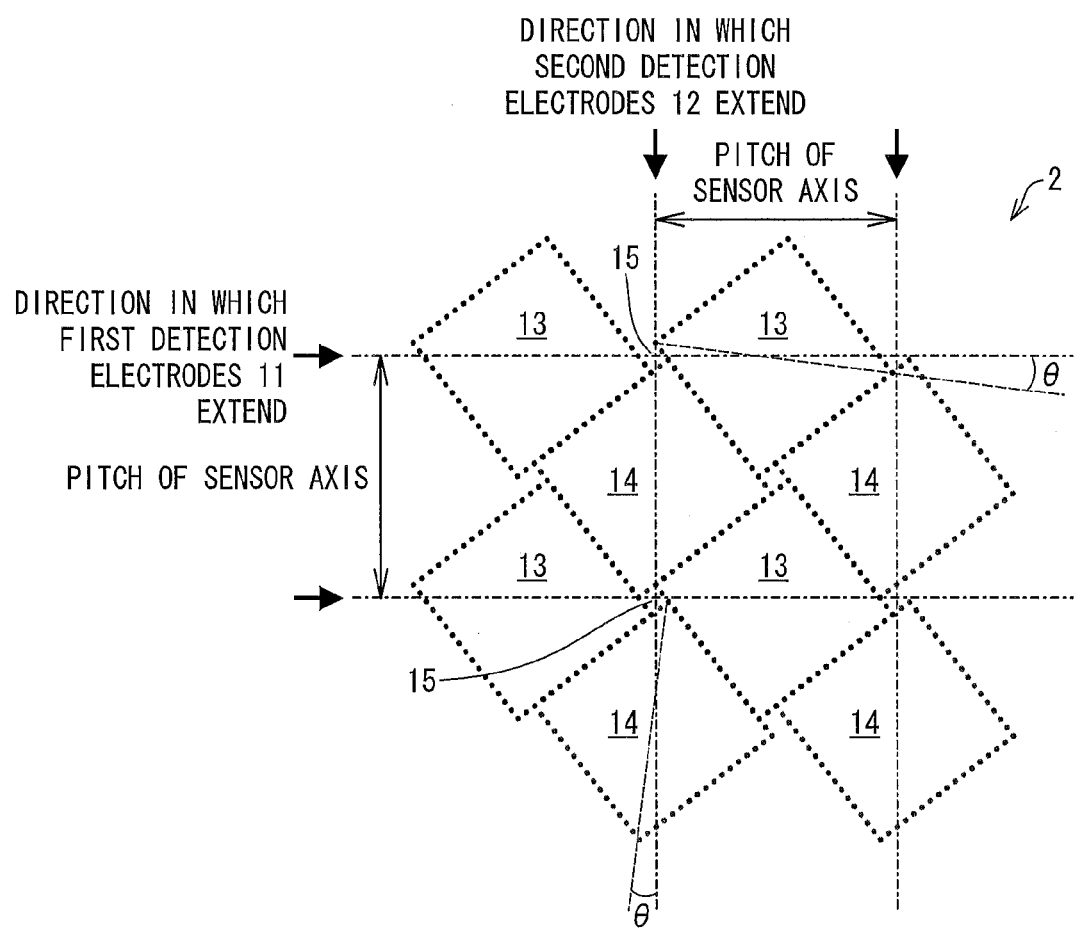
FIG. 2 is a plan view illustrating positions of first detection electrodes and second detection electrodes on a touch panel substrate in accordance with one embodiment of the present invention.

FIG. 2 is a plan view illustrating positions of the first detection electrodes 11 and the second detection electrodes 12 in the touch panel substrate 2 in accordance with the present embodiment. The touch panel substrate 2 is provided with a plurality of the first lattice electrodes 13 each having a square shape and a plurality of second lattice electrodes 14 each having a square shape. Squares indicating shapes of the plurality of the first lattice electrodes 13 and shapes of the plurality of second lattice electrodes 14 (regions where the plurality of the first lattice electrodes 13 and the plurality of second lattice electrodes 14 are provided) are inclined uniformly. The first lattice electrodes 13 are provided in a layer different from a layer where the second lattice electrodes 14 are provided. In a plan view, the first lattice electrodes 13 are provided in regions different from regions where the second lattice electrodes 14 are provided.

The first lattice electrodes 13 and the second lattice electrodes 14 are each made of conductive lines provided to form a lattice having a square shape. Accordingly, light emitted from the display panel can pass through the touch panel substrate 2.

A pitch of the first detection electrodes 11 and a pitch of the second detection electrodes 12 are identical to each other. This allows a position where a detection target touches to be detected with the same accuracy both in a longitudinal direction and in a lateral direction. The pitch of the first detection electrodes 11 and the pitch of the second detection electrodes 12 are determined as specifications in accordance with required performance (detection accuracy, detection resolution). Accordingly, the pitch of the first detection electrodes 11 and the pitch of the second detection electrodes 12 (i.e. pitches of sensor axes) are the same as those in the Referential Example illustrated in FIG. 15. The first lattice electrodes 13 are provided to be spaced from each other. The second lattice electrodes 14 are provided to be spaced from each other.

In a case where the pitch of the first detection electrodes 11 and the pitch of the second detection electrodes 12 are different from each other, the first lattice electrodes 13 and the second lattice electrodes 14 each have a diamond shape. In this case, the first lattice electrodes 13 and the second lattice electrodes 14 are each made of conductive lines provided to form a diamond-shaped lattice.

Although FIG. 2 does not illustrate detailed configurations of the first lattice electrodes 13 and the second lattice electrodes 14, plural ones of the first lattice electrodes 13 which ones are positioned to be spaced from each other in a lateral direction are electrically connected with each other via a connecting section provided at a square region 15 between the plural ones of the first lattice electrodes 13. The first detection electrodes 11 are each provided with plural ones of the first lattice electrodes 13 which ones are positioned side-by-side in a lateral direction. Plural ones of the first detection electrodes 11 extending in a lateral direction are aligned in a longitudinal direction.

Plural ones of the second lattice electrodes 14 which ones are positioned to be spaced from each other in a longitudinal direction are electrically connected with each other via another connecting section provided at the square region 15 between the plural ones of the second lattice electrodes 14. The second detection electrodes 12 are each provided with plural ones of the second lattice electrodes 14 which ones are positioned side-by-side in a longitudinal direction. Plural ones of the second detection electrodes 12 extending in a longitudinal direction are aligned in a lateral direction.

A diagonal of each of the first lattice electrodes 13 (a diagonal connecting two opposing corners of that first lattice electrode 13 which are adjacent to the region 15) is inclined at an angle θ to the direction in which the first detection electrodes 11 extend (lateral direction). Here, $\theta=\arctan(1/n)$. It should be noted that the first lattice electrodes 13 are aligned in the direction in which the first detection electrodes 11 extend. Similarly, a diagonal of each of the second lattice electrodes 14 (a diagonal connecting two opposing corners of that second lattice electrode 14 which are adjacent to the region 15) is inclined at the angle θ to the direction in which the second detection electrodes 12 extend (longitudinal direction). It should be noted that the second lattice electrodes 14 are aligned in the direction in which the second detection electrodes 12 extend.

(Configuration of First Electrode Layer 6)

Figure 3:
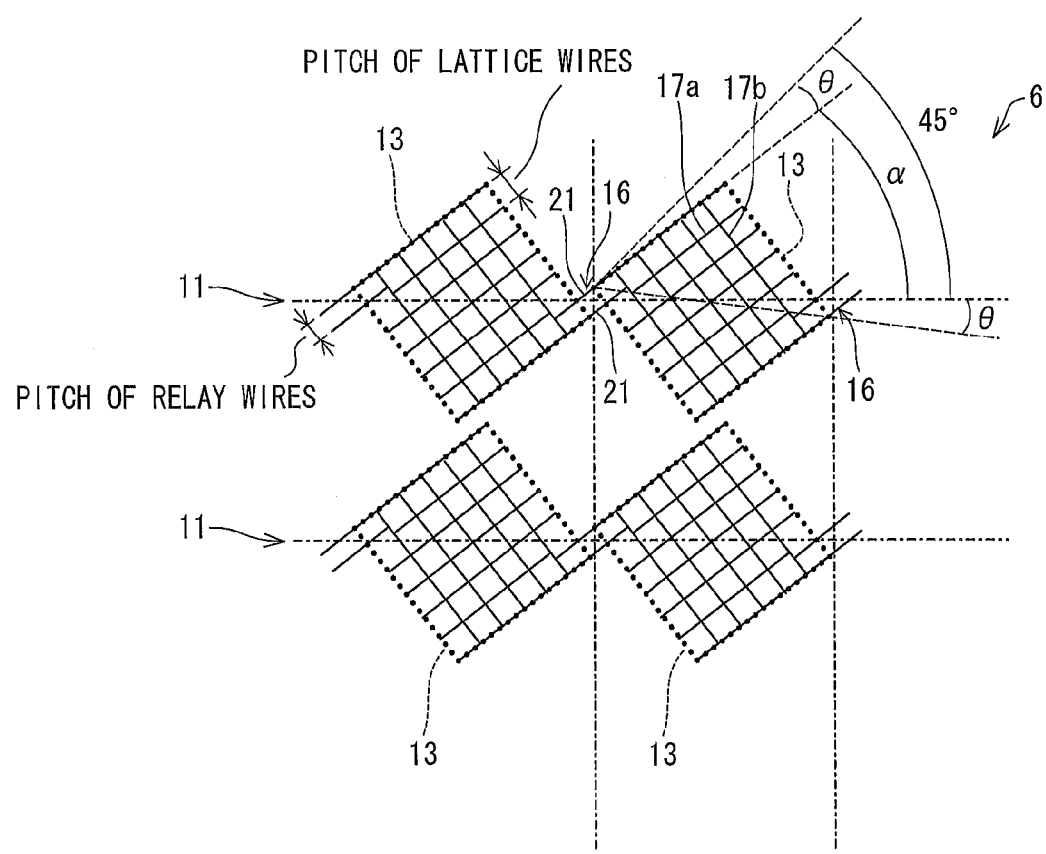
FIG. 3 is a plan view illustrating a detailed configuration of the first detection electrodes.

FIG. 3 is a plan view illustrating a detailed configuration of the first detection electrodes 11 on the first electrode layer 6. In FIG. 3, a shape of each of the first lattice electrodes 13 is indicated by a dotted line, and conductive lines (first conductive lines, second conductive lines) 17a and 17b constituting each of the first lattice electrodes 13 are indicated by solid lines. In the example illustrated in FIG. 3, the division number m is 6, and n for determining the angle of the lattice wires is 8. In this case, θ=7.1°. The angle of the lattice wires in the present embodiment is the same as the angle in the Referential Example. However, since the division number m in the present embodiment is different from that in the Referential Example, the pitch of the lattice wires in the present embodiment is different from that in the Referential Example.

The first detection electrodes 11 extend in a lateral direction, and are each provided with plural ones of the first lattice electrodes 13. Adjacent ones of the first lattice electrodes 13 in a lateral direction are spaced from each other with a connecting section 16 (first connecting section) therebetween.

The first lattice electrodes 13 each include a plurality of conductive lines 17a and a plurality of conductive lines 17b. The plurality of conductive lines 17a are parallel to each other and are inclined at an angle α to the direction in which the first detection electrodes 11 extend (lateral direction). $\alpha=45°-\theta$. α is larger than 0° and smaller than 45°. Since $2\le m<n$, $45°-\arctan(1/2)<\alpha<45°$. The plurality of conductive lines 17b are parallel to each other and are perpendicular to the conductive lines 17a. The plurality of conductive lines 17a and the plurality of conductive lines 17b form a lattice which is along and parallel to a shape of each of the first lattice electrodes 13. That is, a lattice of the conductive lines 17a and 17b is formed in such a manner that the conductive lines 17a and the conductive lines 17b are parallel to sides of the shape (square) of the first lattice electrode 13. In this case, since the first lattice electrode 13 has a square shape, the conductive lines (lattice wires) 17a and 17b constituting the first lattice electrode 13 are provided to form a square lattice. That is, a pitch of the plurality of the conductive lines 17a is equal to a pitch of the plurality of conductive lines 17b.

The connecting section 16 includes a plurality of conductive lines (fifth conductive lines) 21. Adjacent ones of the first lattice electrodes 13 are connected via the conductive lines 21 of the connecting section 16. The plurality of conductive lines 21 are parallel to the conducive lines 17a. In the present embodiment, the connecting section 16 includes two conductive lines. Alternatively, the connecting section 16 may include three or more conductive lines 21.

Adjacent ones of the first lattice electrodes 13 in a longitudinal direction are disconnected from each other. The first lattice electrodes 13 and the connecting section 16 are provided in the same layer (first electrode layer 6 in FIG. 1).

The conductive lines 17a and 17b and the conductive lines 21 are made of, for example, a light-shielding metal with low resistance.

A pitch of the conductive lines 21 of the connecting section 16 is different from the pitch of the lattice wires 17a constituting the first lattice electrode 13. This is because in a case of n≠m, the square region 15 (see FIG. 2) at a gap between the first lattice electrode 13 and the second lattice electrode 14 has a size different from that of a unit lattice in the first lattice electrode 13. Since n>m in the present embodiment, the pitch of two conductive lines 21 of the connecting section 16 is smaller than the pitch of the conductive lines 17a constituting the first lattice electrode 13. In this case, one of the conductive lines 21 of the connecting section 16 extends along the conductive line 17a of the first lattice electrode 13 on a left side of said one of the conductive lines 21 (is aligned with the conductive line 17*a*), and the other of the conductive lines 21 of the connecting section 16 extends along the conductive line 17*a* of the first lattice electrode 13 on a right side of said the other of the conductive lines 21. It should be noted that respective conductive lines 17*a* of two adjacent first lattice electrodes 13 are not lined up (are not aligned with each other).

A diagonal of each of the first lattice electrodes 13 (a diagonal connecting two opposing corners of that first lattice electrode 13 which are adjacent to the connecting section 16) is inclined at an angle θ to the direction in which the first detection electrodes 11 extend (lateral direction). That is, a diagonal of a unit lattice (quadrangle as a minimum unit) of a lattice constituting the first lattice electrode 13 is inclined at the angle θ to the direction in which the first detection electrodes 11 extend (lateral direction). It should be noted that the first lattice electrodes 13 are aligned in the direction in which the first detection electrodes 11 extend (sensor axis in a lateral direction).

As described above, in the present embodiment, the first lattice electrodes 13 and the conductive lines (lattice wires) 17*a* and 17*b* forming the lattice of each of the first lattice electrodes 13 are inclined at a predetermined angle, and adjacent ones of the first lattice electrodes 13 with a gap therebetween are connected via the connecting section 16. In this configuration, in a case where the conductive lines (lattice wires) 17*a* and 17*b* forming a lattice are inclined by ±arctan(1/n) to an inclination of 45°, the lattice wires 17*a* and 17*b* can be provided at an angle at which moiré is less likely to occur. Since m≠n, respective lattice wires 17*a* of adjacent ones of the first lattice electrodes 13 are misaligned. However, by making the pitch of the conductive lines 21 of the connecting section 16 smaller than the pitch of the lattice wires 17*a*, it is possible to connect adjacent ones of the first lattice electrodes 13 via at least two conductive lines 21. Accordingly, even when one of at least two conductive lines of the connecting section 16 is broken, electrical connection is maintained via the other of the at least two conductive lines 21.

(Configuration of Second Electrode Layer 7)

Figure 4:
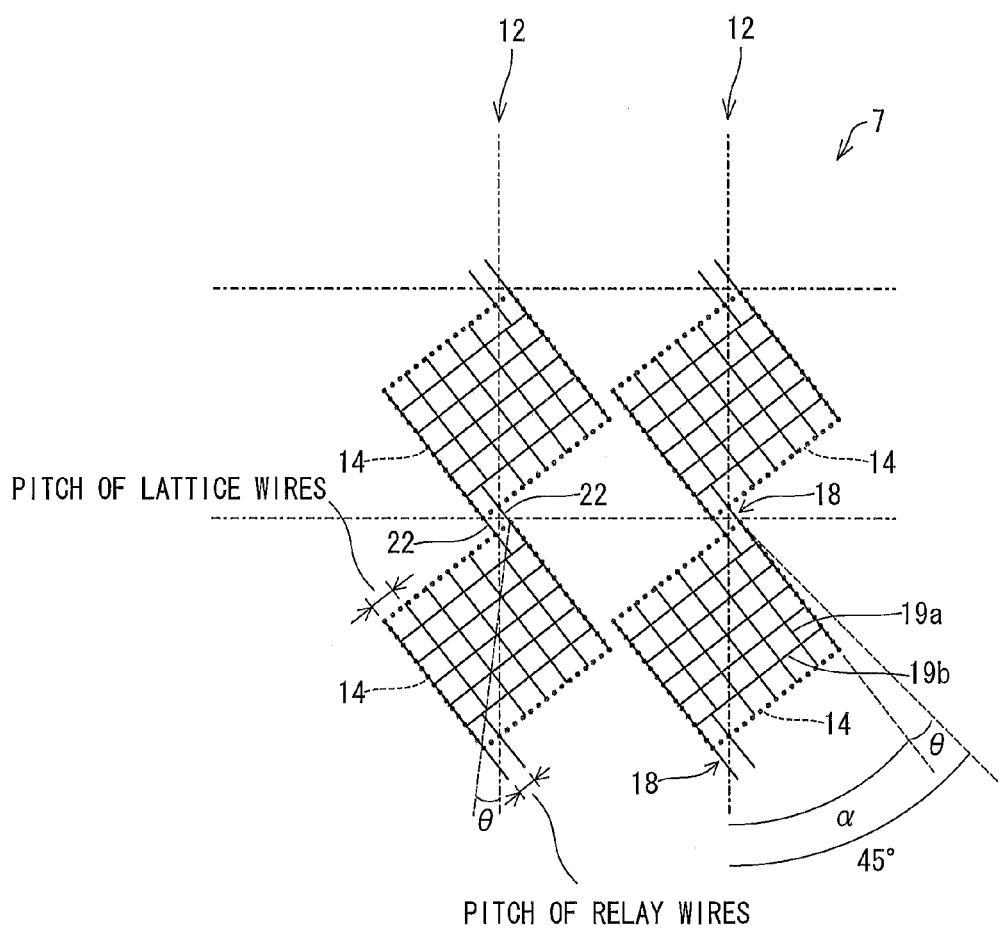
FIG. 4 is a plan view illustrating a detailed configuration of the second detection electrodes.

FIG. 4 is a plan view illustrating a detailed configuration of the second detection electrodes 12 on the second electrode layer 7. In FIG. 4, a shape of each of the second lattice electrodes 14 is indicated by a dotted line, and conductive lines (third conductive lines, fourth conductive lines) 19*a* and 19*b* constituting each of the second lattice electrodes 14 are indicated by solid lines. The second detection electrode 12 has a configuration in which the first detection electrode 11 is rotated by 90°.

The second detection electrodes 12 extend in a longitudinal direction, and are each provided with plural ones of the second lattice electrodes 14. Adjacent ones of the second lattice electrodes 14 in a longitudinal direction are spaced from each other with a connecting section 18 (second connecting section) therebetween.

The second lattice electrodes 14 each include a plurality of conductive lines 19*a* and a plurality of conductive lines 19*b*. The plurality of conductive lines 19*a* are parallel to each other and are inclined at the angle α to the direction in which the second detection electrodes 12 extend (longitudinal direction). The plurality of conductive lines 19*b* are parallel to each other and are perpendicular to the conductive lines 19*a*. The plurality of conductive lines 19*a* and the plurality of conductive lines 19*b* form a lattice which is along and parallel to a shape of each of the second lattice electrodes 14. That is, a lattice of the conductive lines 19*a* and 19*b* is formed in such a manner that the conductive lines 19*a* and the conductive lines 19*b* are parallel to sides of the shape (square) of the second lattice electrode 14. In this case, since the second lattice electrode 14 has a square shape, the conductive lines (lattice wires) 19*a* and 19*b* constituting the second lattice electrode 14 are provided to form a square lattice. That is, a pitch of the plurality of the conductive lines 19*a* is equal to a pitch of the plurality of conductive lines 19*b*.

The connecting section 18 includes a plurality of conductive lines (sixth conductive lines) 22. Adjacent ones of the second lattice electrodes 14 are connected via the conductive lines 22 of the connecting section 18. The plurality of conductive lines 22 are parallel to the conducive lines 19*a*. In the present embodiment, the connecting section 18 includes two conductive lines. Alternatively, the connecting section 18 may include three or more conductive lines 22.

Adjacent ones of the second lattice electrodes 14 in a lateral direction are disconnected from each other. The second lattice electrodes 14 and the connecting section 18 are provided in the same layer (second electrode layer 7 in FIG. 1).

The conductive lines 19*a* and 19*b* and the conductive lines 22 are made of, for example, a light-shielding metal with low resistance.

A pitch of the conductive lines 22 of the connecting section 18 is different from the pitch of the lattice wires 19*a* constituting the second lattice electrode 14. The pitch of two conductive lines 22 of the connecting section 18 is smaller than the pitch of the conductive lines 19*a* constituting the second lattice electrode 14. In this case, one of the conductive lines 22 of the connecting section 18 extends along the conductive line 19*a* of the second lattice electrode 14 on an upper side of said one of the conductive lines 22 (is aligned with the conductive line 19*a*), and the other of the conductive lines 22 of the connecting section 18 extends along the conductive line 19*a* of the second lattice electrode 14*a* on a lower side of said the other of the conductive lines 22. It should be noted that respective conductive lines 19*a* of two adjacent second lattice electrodes 14 are not lined up (are not aligned with each other).

A diagonal of each of the second lattice electrodes 14 (a diagonal connecting two opposing corners of that second lattice electrode 14 which are adjacent to the connecting section 18) is inclined at the angle θ to the direction in which the second detection electrodes 12 extend (longitudinal direction). That is, a diagonal of a unit lattice (quadrangle as a minimum unit) of a lattice constituting the second lattice electrode 14 is inclined at the same angle θ to the direction in which the second detection electrodes 12 extend (longitudinal direction). It should be noted that the second lattice electrodes 14 are aligned in the direction in which the second detection electrodes 12 extend (sensor axis in a longitudinal direction).

(Configuration of Touch Panel Substrate 2)

Figure 5:
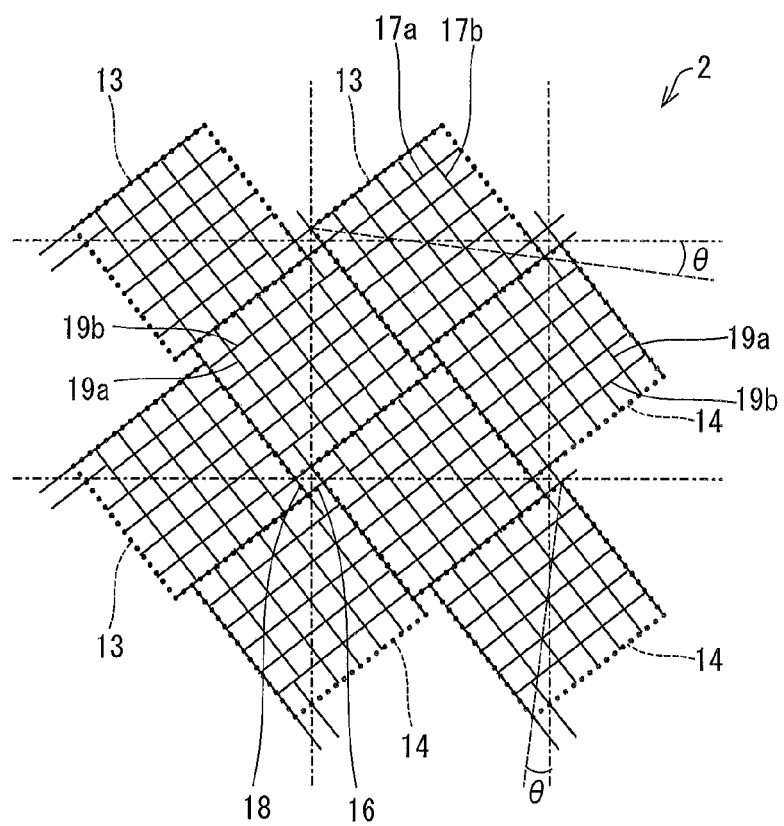
FIG. 5 is a view obtained by overlapping the first detection electrodes in FIG. 3 and the second detection electrodes in FIG. 4, and is a plan view illustrating a configuration of wires of the touch panel substrate.

FIG. 5 is a view obtained by overlapping the first detection electrodes 11 in FIG. 3 and the second detection electrodes 12 in FIG. 4, and is a plan view illustrating a configuration of wires of the touch panel substrate 2.

The conductive lines 17*a* (lattice wires rising rightward) at one angle which form the lattice of the first lattice electrode 13 are parallel to the conductive lines 19*b* (lattice wires rising rightward) at one angle which form the lattice of the second lattice electrode 14. The conductive lines 17*b* (lattice wires falling rightward) at the other angle which form the lattice of the first lattice electrode 13 are parallel to the conductive lines 19a (lattice wires falling rightward) at the other angle which form the lattice of the second lattice electrode 14.

However, the first detection electrodes 11 and the second detection electrodes 12 do not form a uniform lattice pattern. This is because respective lattice wires of the first lattice electrode 13 and the second lattice electrode 14 which are adjacent to each other are not lined up. For example, as for the first lattice electrode 13 and the second lattice electrode 14 which are adjacent to each other in a direction in which the conductive lines 17a extend (third direction), the conductive lines 17a and the conductive lines 19b which are parallel to the conductive lines 17a are not lined up. As for the first lattice electrode 13 and the second lattice electrode 14 which are adjacent to each other in a direction in which the conductive lines 17b extend (fourth direction), the conductive lines 17b are not aligned with the conductive lines 19a which are parallel to the conductive lines 17b.

It should be noted that, since the first lattice electrode 13 and the second lattice electrode 14 have the same density of wires, the touch panel substrate 2 has uniform transmittance. Here, the pitch of the conductive lines of the connecting sections 16 and 18 is different from the pitch of the lattice wires of the first lattice electrode 13 and the second lattice electrode 14. However, the connecting sections 16 and 18 are provided in very small regions in a whole screen and the conductive lines of the connecting sections 16 and 18 and the lattice wires of the first lattice electrode 13 and the second lattice electrode do not greatly differ in density of wires, so that nonuniformity in transmittance (i.e. brightness) is not recognized.

Figure 6:
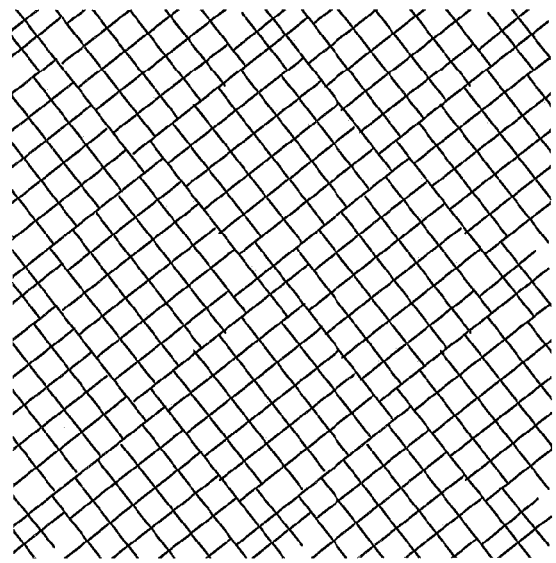
FIG. 6 is a plan view illustrating a configuration of wires of the touch panel substrate.

FIG. 6 is a view illustrating a configuration of wires of the touch panel substrate 2 in which reference signs and lines representing sensor axes are omitted. As illustrated in FIG. 6, a difference between regions where the connecting sections are provided and regions where the lattice wires are provided is difficult to recognize.

Furthermore, the conductive lines 17a and 17b of the first detection electrodes 11, the conductive lines 19a and 19b of the second detection electrodes, and the conductive lines of the connecting sections 16 and 18 are positioned so as not to be on the same lines. Accordingly, even if patterns of the first detection electrodes 11 and the second detection electrodes 12 are misaligned in the production process, the misalignment is difficult to be recognized by a user, and therefore display quality is not deteriorated. The direction in which the first detection electrodes 11 extend (lateral direction) and the direction in which the second detection electrodes 12 extend (longitudinal direction) are orthogonal to each other.

A lattice of a black matrix (not illustrated) provided in the display panel 3 includes (i) strips extending in one direction parallel to the direction in which the first detection electrodes 11 extend (lateral direction) and (ii) strips extending in another direction parallel to the direction in which the second detection electrodes 12 extend (longitudinal direction).

Diagonals of a unit lattice (quadrangle as a minimum unit) of the lattice constituting the first lattice electrode 13 or the second lattice electrode 14 are inclined to both of the direction in which the first detection electrodes 11 extend (lateral direction) and the direction in which the second detection electrodes 12 extend (longitudinal direction). Furthermore, conductive lines of the lattice are also inclined to both of the direction in which the first detection electrodes 11 extend (lateral direction) and the direction in which the second detection electrodes 12 extend (longitudinal direction). One of two diagonals of the lattice is inclined at the angle θ to one of the direction in which the first detection electrodes 11 extend (lateral direction) and the direction in which the second detection electrodes 12 extend (longitudinal direction).

The conductive lines may be extended so that the conductive lines 17a and 17b of the first detection electrode 11 and the conductive lines 19a and 19b of the second detection electrode partially overlap each other. Alternatively, a part of the conductive lines may be removed in order to avoid conduction between the first detection electrodes 11. The number of lines of the lattice and other factors may be appropriately changed so that a length of a side of a shape of each of the first lattice electrode 13 and the second lattice electrode 14 is divided equally.

Figure 7:
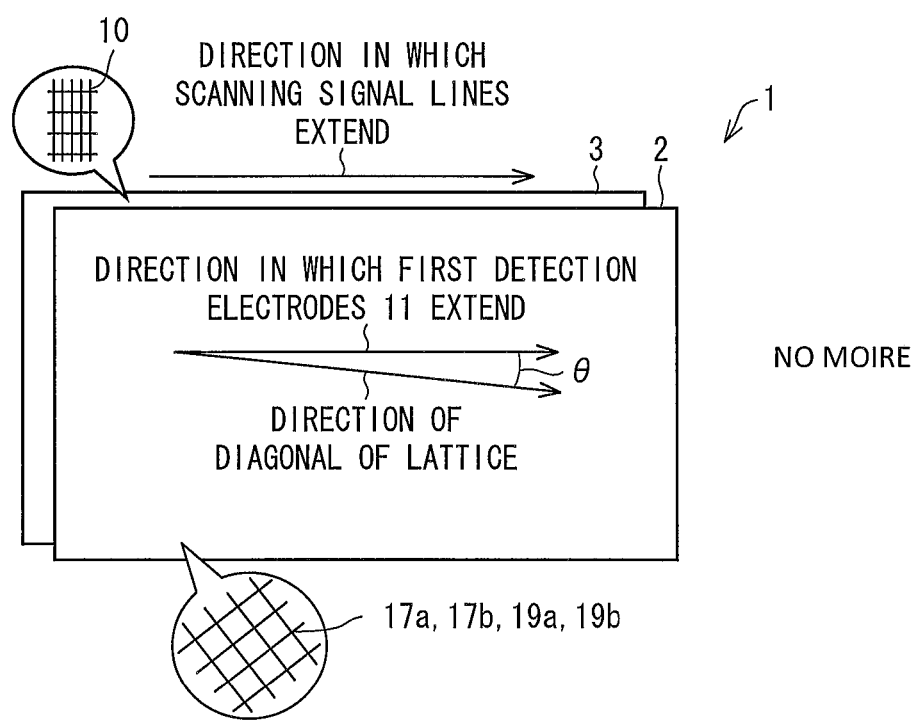
FIG. 7 is a view illustrating overlap of the touch panel substrate and the display panel.

FIG. 7 is a view illustrating overlap of the touch panel substrate 2 and the display panel 3. The display panel 3 is provided with a lattice-shaped black matrix 10 which separates pixels. The black matrix 10 is made of a light-shielding material. In the touch panel substrate 2, the first detection electrodes 11 extend in a lateral direction, and the second detection electrodes 12 extend in a longitudinal direction.

On the other hand, in the touch panel 2, one of diagonals of the lattice is inclined at the angle θ to the direction in which the first detection electrodes 11 extend. An inclination of the lattice wires (angle of a diagonal of the lattice) is determined by n. A relation n>m is met. Since n is a parameter which can be set independently of the division number m, it is possible to determine the inclination of the lattice wires independently of the division number m. Accordingly, lattice wires of the first lattice electrode 13 and lattice wires of the second lattice electrode 14 adjacent to the first lattice electrode 13 are not aligned with each other (see FIG. 5). However, by causing only the pitch of the conductive lines of the connecting sections 16 and 18 to be different from the pitches of the lattice wires 17a, 17b, 19a, and 19b, it is possible to connect the lattice electrodes via two conductive lines and uniform a distribution of transmittance of the touch panel substrate 2. Accordingly, it is possible to set the angle α [α=45°±arctan(1/n)] of the lattice wires 17a independently of the division number m in order to prevent occurrence of moiré. Accordingly, it is possible to produce the display device 1 capable of preventing occurrence of moiré and improving display quality.

Furthermore, in the display device 1, the first detection electrodes 11 and the scanning signal lines extend in the same direction (lateral direction), and the second detection electrodes 12 extend in a direction perpendicular to the scanning signal lines (longitudinal direction). Consequently, the display device 1 can prevent occurrence of moiré and appropriately detect a position where a target object touches.

Unlike the conventional configuration, in which lattice electrodes having a square shape are provided tightly without gaps therebetween, in the present embodiment, the first lattice electrodes 13 and the second lattice electrodes 14 are provided to be inclined together with lattice wires provided therein, and the connecting sections 16 and 18 are provided at a gap (region 15) among the first lattice electrodes 13 and the second lattice electrodes 14. In the touch panel substrate 2, the lattice wires 17a, 17b, 19a, and 19b occupy a large part of the wire pattern. Accordingly, by differentiating the pitch of the conductive lines of the connecting sections 16 and 18 from the pitches of the lattice wires 17a, 17b, 19a, and 19b of the first lattice electrodes 13 and the second lattice electrodes 14, it is possible to enhance a degree of freedom of the pitches of the lattice wires 17a, 17b, 19a, and 19b and a degree of freedom of the angle α of the lattice wires.

Assume that a length of a side of the shape of each of the first lattice electrode and the second lattice electrode is L. In this case, the pitch of the conductive lines of the connecting section is L×(1/n), and the pitch of the lattice wires is L×(1/m). That is, a ratio of the pitch of the conductive lines of the connecting section to the pitch of the lattice wires is m: n (m≠n). In order to prevent occurrence of moiré, it is preferable that m<n. An increase in n indicates that the pitch of the conductive lines of the connecting section is smaller than the pitch of the lattice wires. When the pitch of the conductive lines of the connecting section is extremely small, density of wires increases at an intersection of two connecting sections, so that the intersection may be recognized as a black point. For this reason, it is preferable that the pitch of the conductive lines of the connecting section is larger than a half of the pitch of the lattice wires, i.e. n<2m.

Furthermore, as a result of actually producing panels under various conditions and checking occurrence of moiré, it is found to be particularly preferable that 6≤n≤8. In this case, 7.1°≤θ≤9.5°. That is, it is preferable that 45°−arctan (⅙)≤α≤45°−arctan(⅛). 45°−arctan(⅙)≈35.5°, and 45°−arctan(⅛)≈37.9°.

Second Embodiment

The present embodiment will discuss a configuration in which a plurality of conductive lines of a connecting section which are provided at a smaller pitch than that of lattice wires of a first lattice electrode extend into the first lattice electrode. For convenience, members and configurations having the same functions as those described in First Embodiment with reference to drawings are given the same reference signs and detailed explanations thereof are omitted.

Second Embodiment is the same as First Embodiment (FIGS. 1 and 2) in terms of a laminate structure of a touch panel substrate, pitches of sensor axes, and arrangement of the first lattice electrode and the second lattice electrode.

(Configuration of First Electrode Layer 6)

Figure 8:
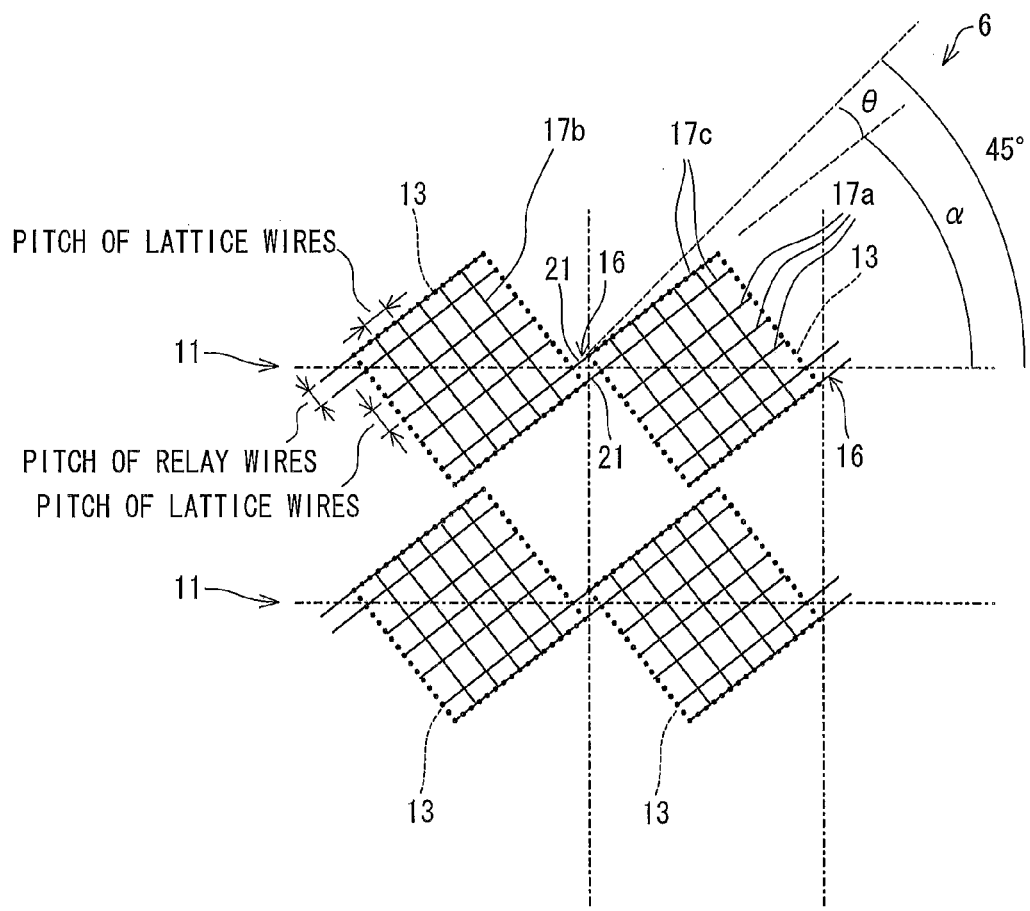
FIG. 8 is a plan view illustrating a detailed configuration of first detection electrodes in a touch panel substrate in accordance with another embodiment of the present invention.

FIG. 8 is a plan view illustrating a detailed configuration of the first detection electrodes 11 in the first electrode layer 6 in accordance with the present embodiment. In FIG. 8, a shape of each first lattice electrode 13 is indicated by a dotted line, and conductive lines (first conductive lines, second conductive lines, and seventh conductive lines) 17a, 17b, and 17c constituting the first lattice electrode 13 are indicated by solid lines. In the example illustrated in FIG. 8, the division number m is 6, and n for determining an angle of the lattice wires is 8. In this case, θ=7.1°. The angle of the lattice wires in the present embodiment is the same as that in First Embodiment.

The first lattice electrode 13 includes a plurality of conductive lines 17a, a plurality of conductive lines 17b, and a plurality of conductive lines 17c. The plurality of conductive lines 17a and the plurality of conductive lines 17c are parallel to each other, and are inclined at an angle α to a direction in which the first detection electrodes 11 extend (lateral direction). Since α=45°−θ and n=8, α=45°−arctan (⅛). The plurality of conductive lines 17b are parallel to each other, and are perpendicular to the conductive lines 17a. The conductive lines 17a, the conductive lines 17b, and the conductive lines 17c are provided to form a lattice which is along and parallel to the shape of the first lattice electrode 13. That is, a lattice of the conductive lines 17a, 17b, and 17c is provided in such a manner that the conductive lines 17a, 17b, and 17c are parallel to sides of the shape (square) of the first lattice electrode 13. In this case, a pitch of the conductive lines 17a and a pitch of the conductive lines 17b are equal to each other. However, the pitch of the conductive lines 17a is different from a pitch of the conductive lines 17c.

The connecting section 16 includes a plurality of conductive lines (fifth conductive lines) 21. The conductive lines 21 are parallel to the conductive lines 17a and 17c. In the present embodiment, the connecting section 16 includes two conductive lines 21.

The conductive lines 17a, 17b, and 17c and the conductive lines 21 are made of, for example, a light-shielding metal with low resistance.

The pitch of the conductive lines 21 of the connecting section 16 is the same as the pitch of the conductive lines 17c constituting the first lattice electrode 13. The conductive lines 17c constituting the first lattice electrode 13 are aligned with the conductive lines 21 of the connecting section 16. Consequently, the respective conductive lines 17c of adjacent two first lattice electrodes 13 are aligned.

As described above, in the present embodiment, the first lattice electrodes 13 and the conductive lines 17a to 17c forming the lattice of each of the first lattice electrodes 13 are inclined at a predetermined angle, and adjacent ones of the first lattice electrodes 13 with a gap therebetween are connected via the connecting section 16. In this configuration, in a case where the conductive lines 17a, 17b, and 17c forming the lattice are inclined by ±arctan(1/n) to an inclination of 45°, the conductive lines 17a, 17b, and 17c can be provided at an angle at which moiré is less likely to occur. Since m≠n, respective conductive lines 17a of adjacent ones of the first lattice electrodes 13 are not lined up. In this case, by causing the pitch of the conductive lines 17c which are a part of the conductive lines forming the lattice and the pitch of the conductive lines 21 of the connecting section 16 to be smaller than the pitch of the conductive lines 17a, the conductive lines 21 of the connecting section 16 and the conductive lines 17c forming the lattice can be aligned.

As described above, even when the pitch of a part of the conductive lines 17c is different from the pitch of the conductive lines 17a and 17b, angles of the conductive lines 17a to 17c can be adjusted with the sensor axis extending in a lateral direction. Accordingly, it is possible to realize a touch panel substrate in which occurrence of moiré is reduced.

(Configuration of Second Electrode Layer 7)

Figure 9:
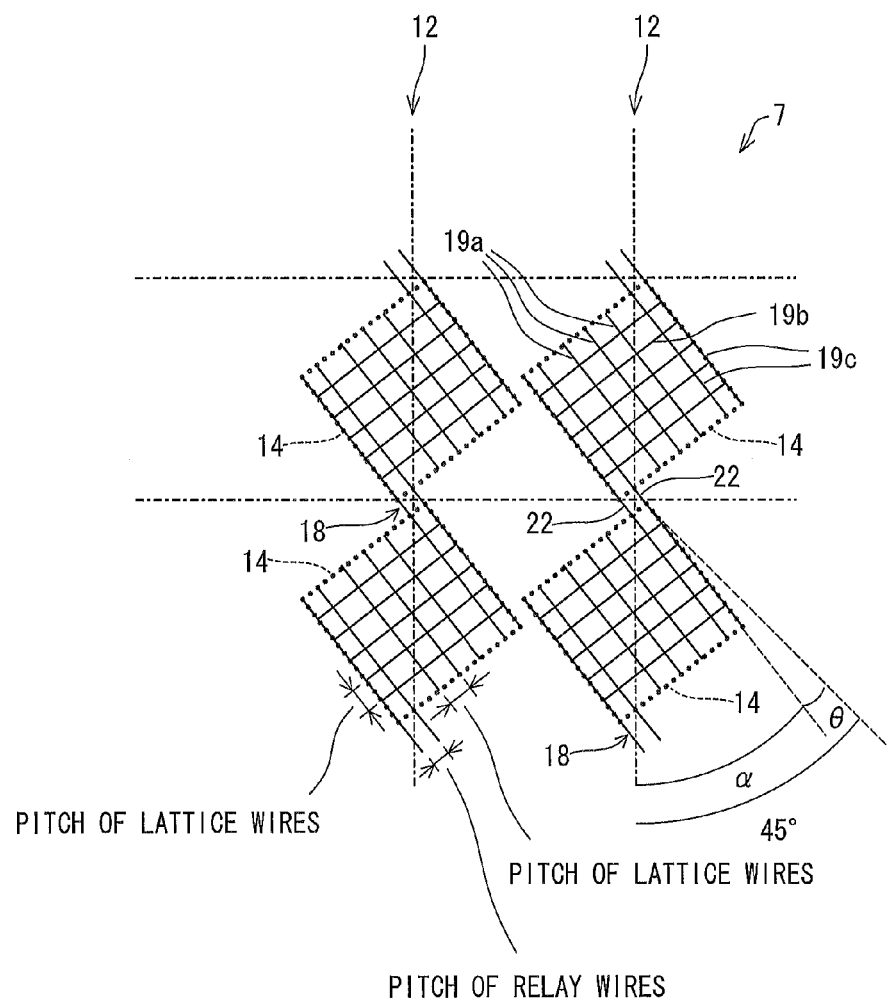
FIG. 9 is a plan view illustrating a detailed configuration of the second detection electrodes in the touch panel substrate.

FIG. 9 is a plan view illustrating a detailed configuration of the second detection electrodes 12 in the second electrode layer 7. In FIG. 9, a shape of each second lattice electrode 14 is indicated by a dotted line, and conductive lines (third conductive lines, fourth conductive lines, and seventh conductive lines) 19a, 19b, and 19c constituting the second lattice electrode 14 are indicated by solid lines. The second detection electrode 12 has a configuration in which the first detection electrode 11 in FIG. 8 is rotated by 90°.

The second lattice electrode 14 includes a plurality of conductive lines 19a, a plurality of conductive lines 19b, and a plurality of conductive lines 19c. The plurality of conductive lines 19a and the plurality of conductive lines 19c are parallel to each other, and are inclined at the angle α to a direction in which the second detection electrodes 12 extend (longitudinal direction). Since n=8, α=45°−arctan(⅛). The plurality of conductive lines 19b are parallel to each other, and are perpendicular to the conductive lines 19a. The conductive lines 19a, the conductive lines 19b, and the conductive lines 19c are provided to form a lattice which is along and parallel to the shape of the second lattice electrode 14. That is, a lattice of the conductive lines 19a, 19b, and 19c is provided in such a manner that the conductive lines 19a, 19b, and 19c are parallel to sides of the shape (square) of the second lattice electrode 14. In this case, a pitch of the conductive lines 19a and a pitch of the conductive lines 19b are equal to each other. However, the pitch of the conductive lines 19a is different from a pitch of the conductive lines 19c.

The connecting section 18 includes a plurality of conductive lines (sixth conductive lines) 22. The conductive lines 22 are parallel to the conductive lines 19a and 19c. In the present embodiment, the connecting section 18 includes two conductive lines 22.

The conductive lines 19a, 19b, and 19c and the conductive lines 22 are made of, for example, a light-shielding metal with low resistance.

The pitch of the conductive lines 22 of the connecting section 18 is the same as the pitch of the conductive lines 19c constituting the second lattice electrode 14. The conductive lines 19c constituting the second lattice electrode 14 are aligned with the conductive lines 22 of the connecting section 18. Consequently, respective conductive lines 1c of adjacent two second lattice electrodes 14 are aligned.

As described above, in the present embodiment, the second lattice electrodes 14 and the conductive lines 19a to 19c forming the lattice of each of the second lattice electrodes 14 are inclined at a predetermined angle, and adjacent ones of the second lattice electrodes 14 with a gap therebetween are connected with each other via the connecting section 18. In this configuration, in a case where the conductive lines 19a, 19b, and 19c forming the lattice are inclined by ±arctan(1/n) to an inclination of 45°, the conductive lines 19a, 19b, and 19c can be provided at an angle at which moiré is less likely to occur. Since m≠n, respective conductive lines 19a of adjacent ones of the second lattice electrodes 14 are not lined up. In this case, by causing the pitch of the conductive lines 19c which are a part of the conductive lines forming the lattice and the pitch of the conductive lines 22 of the connecting section 18 to be smaller than the pitch of the conductive lines 19a, the conductive lines 22 of the connecting section 18 and the conductive lines 19c forming the lattice can be aligned.

As described above, even when the pitch of a part of the conductive lines 19c is different from the pitch of the conductive lines 19a and 19b, angles of the conductive lines 19a to 19c can be adjusted with the sensor axis extending in a longitudinal direction. Accordingly, it is possible to realize a touch panel substrate in which occurrence of moiré is reduced.

(Configuration of Touch Panel Substrate 20)

Figure 10:
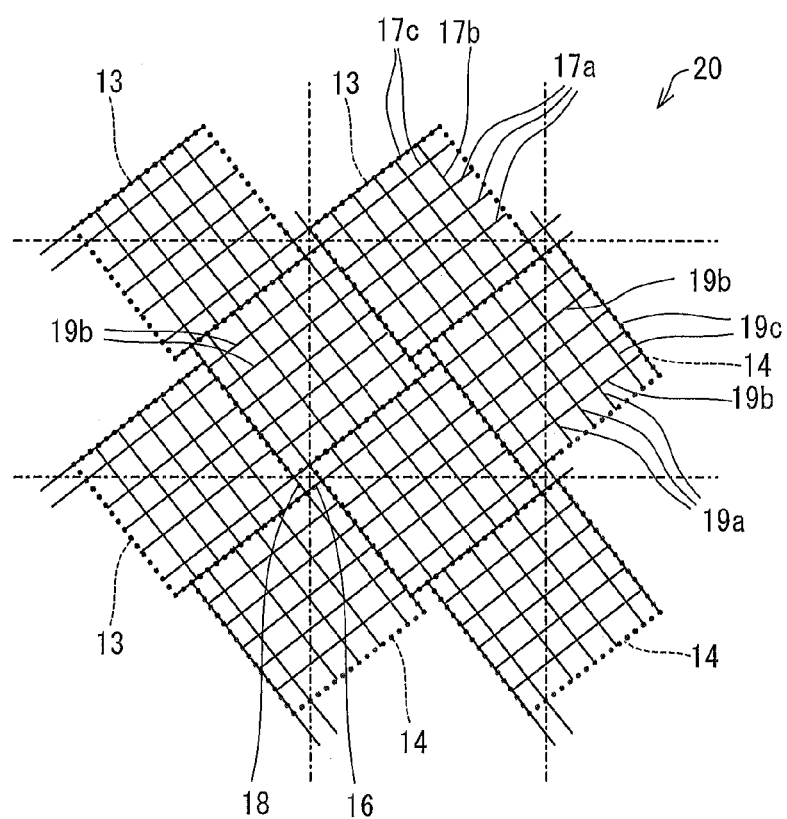
FIG. 10 is a view obtained by overlapping the first detection electrodes in FIG. 8 and the second detection electrodes in FIG. 9, and is a plan view illustrating a configuration of wires of the touch panel substrate.

FIG. 10 is a view obtained by overlapping the first detection electrodes 11 in FIG. 8 and the second detection electrodes 12 in FIG. 9, and is a plan view illustrating a configuration of wires of a touch panel substrate 20 in accordance with the present embodiment.

The conductive lines 17a (lattice wires rising rightward) and the conductive lines 17c each at one angle which form the lattice of the first lattice electrode 13 are parallel to the conductive lines 19b (lattice wires rising rightward) at one angle which form the lattice of the second lattice electrode 14. The conductive lines 17b (lattice wires falling rightward) at the other angle which form the lattice of the first lattice electrode 13 are parallel to the conductive lines 19a (lattice wires falling rightward) and the conductive lines 19c each at the other angle which form the lattice of the second lattice electrode 14.

However, the first detection electrodes 11 and the second detection electrodes 12 do not form a uniform lattice pattern. This is because respective lattice wires of the first lattice electrode 13 and the second lattice electrode 14 which are adjacent to each other are not aligned with each other. For example, as for the first lattice electrode 13 and the second lattice electrode 14 which are adjacent to each other in a direction in which the conductive lines 17a extend (third direction), the conductive lines 17a and the conductive lines 19b which are parallel to the conductive lines 17a are not aligned with each other. As for the first lattice electrode 13 and the second lattice electrode 14 which are adjacent to each other in a direction in which the conductive lines 17b extend (fourth direction), the conductive lines 17b are not aligned with the conductive lines 19a which are parallel to the conductive lines 17b.

Here, the pitch of the conductive lines 17c, the pitch of the conductive lines 19c, and the pitch of the conductive lines of the connecting sections 16 and 18 are different from the pitches of the conductive lines 17a, 17b, 19a, and 19b which are main conductive lines forming the lattices of the first lattice electrode 13 and the second lattice electrode 14. However, the conductive lines 17c, the conductive lines 19c, and the conductive lines of the connecting sections 16 and 18 are provided in regions smaller than regions where the conductive lines 17a, 17b, 19a, and 19b are provided. For example, in the first lattice electrode 13, the wires rising rightward are the conductive lines 17a having a first pitch and the conductive lines 17c having a second pitch, whereas the wires falling rightward are only the conductive lines 17b having a first pitch. This configuration sufficiently yields an effect of preventing occurrence of moiré as in the configuration of First Embodiment.

Furthermore, the conductive lines 17a to 17c of the first detection electrodes 11, the conductive lines 19a to 19c of the second detection electrodes, and the conductive lines of the connecting sections 16 and 18 are positioned so as not to be on the same lines. Accordingly, even if patterns of the first detection electrodes 11 and the second detection electrodes 12 are misaligned in the production process, the misalignment is difficult to be recognized by a user, and therefore display quality is not deteriorated. The direction in which the first detection electrodes 11 extend (lateral direction) and the direction in which the second detection electrodes 12 extend (longitudinal direction) are orthogonal to each other.

Third Embodiment

The present embodiment will discuss a configuration in which conductive lines of the connecting section are bended so as to be connected with the first lattice electrode. For convenience, members and configurations having the same functions as those described in First Embodiment with reference to drawings are given the same reference signs and detailed explanations thereof are omitted.

Third Embodiment is the same as First Embodiment (FIGS. 1 and 2) in terms of a laminate structure of a touch panel substrate, pitches of sensor axes, and an arrangement of the first lattice electrode and the second lattice electrode.

(Configuration of First Electrode Layer 6)

Figure 11:
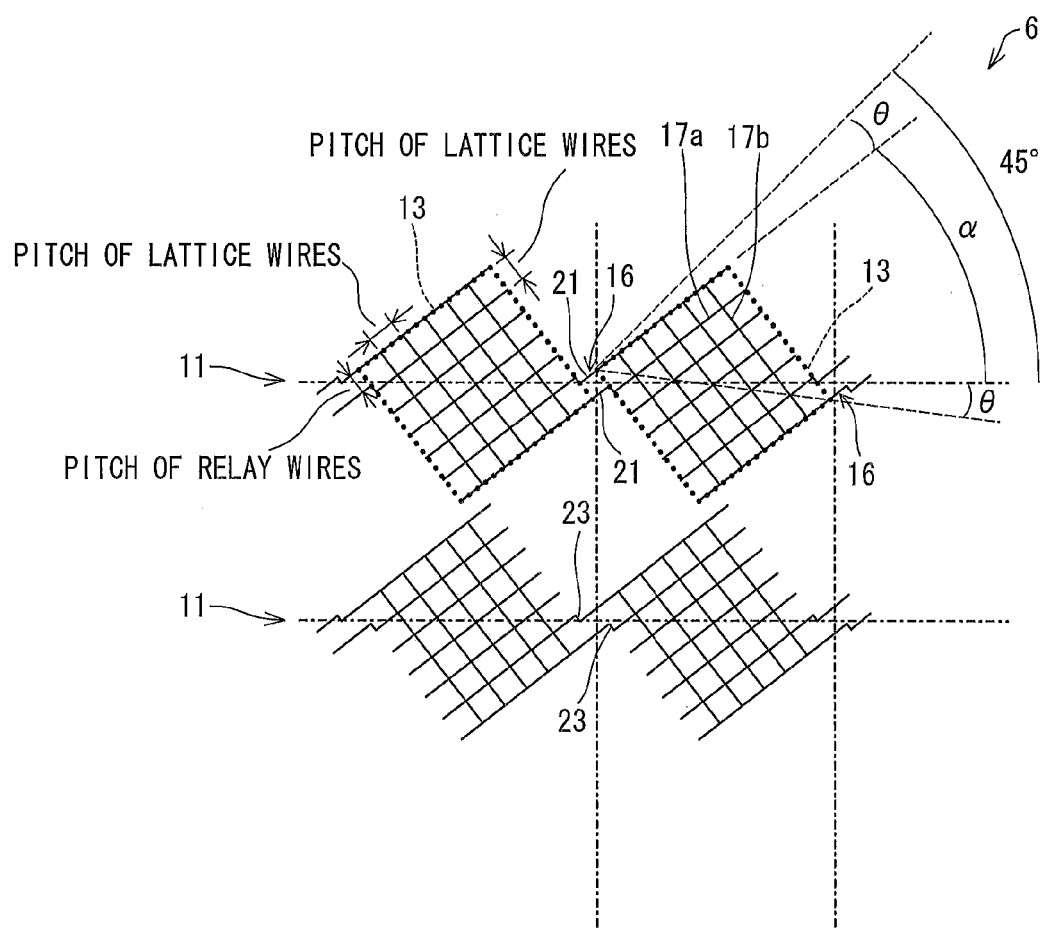
FIG. 11 is a plan view illustrating a detailed configuration of first detection electrodes in a touch panel substrate in accordance with still another embodiment of the present invention.

FIG. 11 is a plan view illustrating a detailed configuration of the first detection electrodes 11 in the first electrode layer 6 in accordance with the present embodiment. In FIG. 11, a shape of each first lattice electrode 13 is indicated by a dotted line, and conductive lines (first conductive lines, second conductive lines, and seventh conductive lines) 17a, 17b, and 17c constituting the first lattice electrode 13 are indicated by solid lines. In the example illustrated in FIG. 11, the division number m is 6, and n for determining an angle of the lattice wires is 8. In this case, θ=7.1°. The angle of the lattice wires in the present embodiment is the same as that in First Embodiment.

The first lattice electrode 13 includes a plurality of conductive lines 17a and a plurality of conductive lines 17b. The plurality of conductive lines 17a are parallel to each other, and are inclined at an angle α to a direction in which the first detection electrodes 11 extend (lateral direction). Since α=45°−θ and n=8, α=45°−arctan(⅛). The plurality of conductive lines 17b are parallel to each other, and are perpendicular to the conductive lines 17a. The conductive lines 17a and the conductive lines 17b are provided to form a lattice which is along and parallel to a shape of the first lattice electrode 13. That is, a lattice of the conductive lines 17a and 17b is provided in such a manner that the conductive lines 17a and 17b are parallel to sides of the shape (square) of the first lattice electrode 13. In this case, a pitch of the conductive lines 17a and a pitch of the conductive lines 17b are equal to each other.

A pitch of the conductive lines 21 of the connecting section 16 is different from the pitch of the lattice wires 17a constituting the first lattice electrode 13. Since n>m in the present embodiment, the pitch of two conductive lines 21 of the connecting section 16 is smaller than the pitch of the conductive lines 17a constituting the first lattice electrode 13. Here, the conductive lines 21 in one direction of the connecting section 16 extend along the conductive line 17a of the first lattice electrode 13 on a left side of said one of the conductive lines 21 (is aligned with the conductive line 17a), and the conductive lines 21 in the other direction of the connecting section 16 extend along the conductive line 17a of the first lattice electrode 13 on a right side of said the other of the conductive lines 21. It should be noted that respective conductive lines 17a of two adjacent first lattice electrodes 13 are not lined up (are not aligned with each other).

Figure 12:
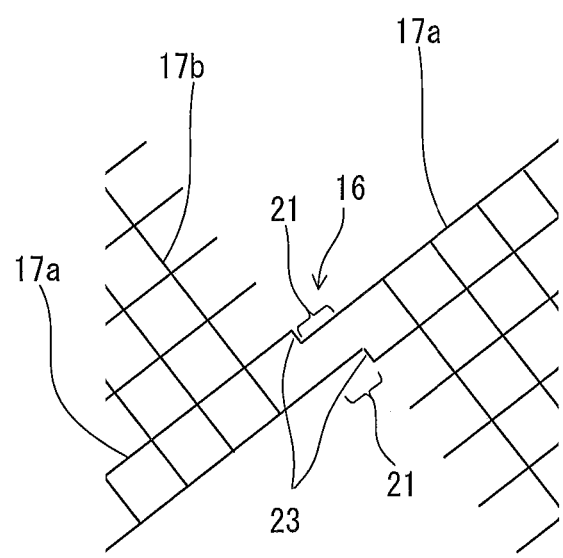
FIG. 12 is a view enlarging a connecting section between the first detection electrodes and vicinities of the connecting section.

FIG. 12 is a view enlarging the connecting section 16 in FIG. 11 and vicinities thereof.

The connecting section 16 includes a plurality of conductive lines (fifth conductive lines) 21 and a plurality of conductive lines (eighth conductive lines) 23. The plurality of conductive lines 21 are parallel to the conductive lines 17a. In contrast, the plurality of conductive lines 23 are parallel to the conductive lines 17b. That is, the conductive lines 23 are perpendicular to the conductive lines 21. In the present embodiment, the connecting section 16 includes two conductive lines 21 and two conductive lines 23.

The conductive line 21 located in an upper part of the connecting section 16 is not aligned with the conductive line 17a of the first lattice electrode 13, the conductive line 17a being adjacently to a left of the connecting section 16. The conductive line 21 and the conductive line 17a which are not aligned with each other are connected with each other via the conductive line 23 located in a left part of the connecting section 16. Similarly, the conductive line 21 located in a lower part of the connecting section 16 and the conductive line 17a of the first lattice electrode 13, the conductive line 17a being adjacently to a right of the connecting section 16, are connected with each other via the conductive line 23 located in a right part of the connecting section 16.

The conductive lines 23 of the connecting section 16 are provided at positions which overlap lines on which conductive lines of the second lattice electrode are provided.

The conductive lines 17a and 17b and the conductive lines 21 and 23 are made of, for example, a light-shielding metal with low resistance.

As described above, in the present embodiment, the first lattice electrodes 13 and the conductive lines (lattice wires) 17a and 17b forming the lattice of each of the first lattice electrodes 13 are inclined at a predetermined angle, and adjacent ones of the first lattice electrodes 13 with a gap therebetween are connected via the connecting section 16. In this configuration, in a case where the conductive lines (lattice wires) 17a and 17b forming a lattice are inclined by ±arctan(1/n) to an inclination of 45°, the lattice wires 17a and 17b can be provided at an angle at which moiré is less likely to occur. Since m≠n, respective lattice wires 17a of adjacent ones of the first lattice electrodes 13 are not lined up. Here, by making the pitch of the conductive lines 21 of the connecting section 16 smaller than the pitch of the lattice wires 17a and connecting the conductive lines 21 with the lattice wires 17a via the conductive lines 23 perpendicular to the conductive lines 21 and the lattice wires 17a, it is possible to connect adjacent ones of the first lattice electrodes 13 via at least two sets of the conductive line 21 and the conductive line 23. Accordingly, even when one of the two sets of the conductive lines 21 and 23 of the connecting section 16 is broken, electrical connection is maintained via the other of the two sets of the conductive lines 21 and 23.

In order to reduce a possibility of disconnection of wires in production, the configuration of FIG. 12, in which configuration the conductive line 21 and the conductive line 23 are connected with each other at their respective ends, may be replaced with a configuration in which the conductive line 21 and the conductive line 23 which are extended intersect (cross each other).

(Configuration of Second Electrode Layer 7)

Figure 13:
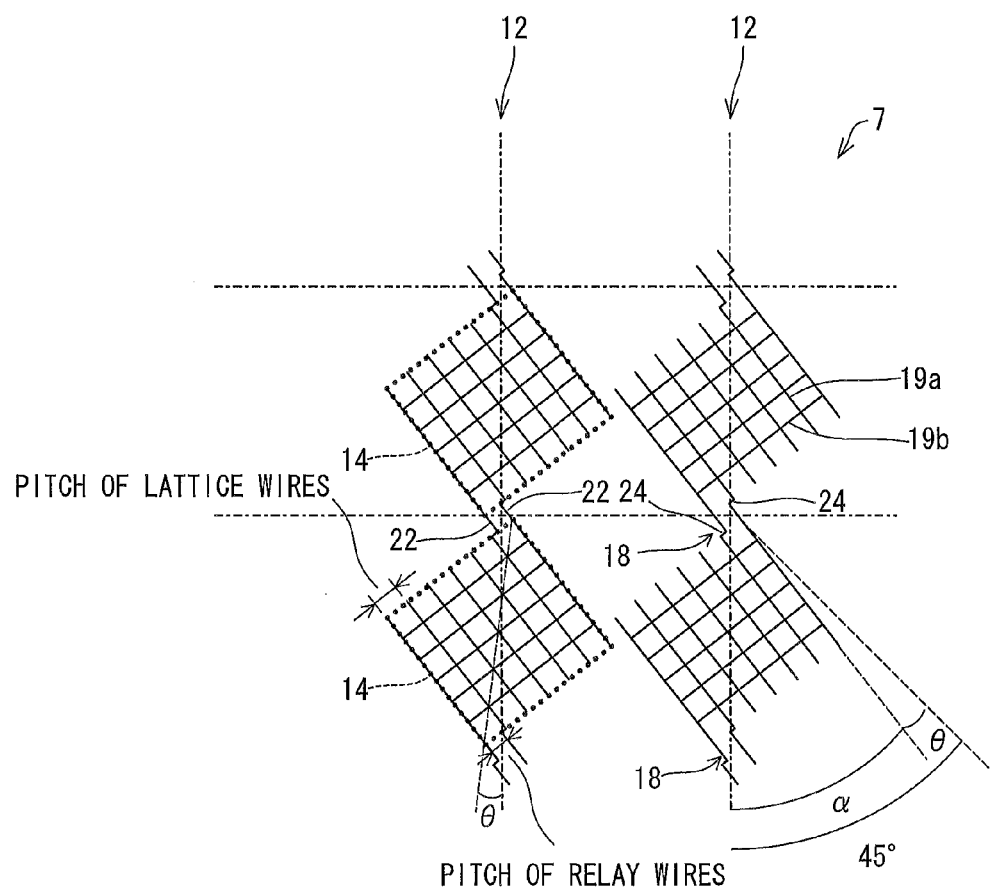
FIG. 13 is a plan view illustrating a detailed configuration of second detection electrodes in the touch panel substrate.

FIG. 13 is a plan view illustrating a detailed configuration of the second detection electrodes 12 in the second electrode layer 7. In FIG. 13, a shape of each second lattice electrode 14 is indicated by a dotted line, and conductive lines (third conductive lines and fourth conductive lines) 19a and 19b constituting the second lattice electrode 14 are indicated by solid lines. The second detection electrode 12 has a configuration in which the first detection electrode 11 is rotated by 90°.

The second lattice electrode 14 includes a plurality of conductive lines 19a and a plurality of conductive lines 19b. The plurality of conductive lines 19a are parallel to each other, and are inclined at an angle α to a direction in which the second detection electrodes 12 extend (longitudinal direction). The plurality of conductive lines 19b are parallel to each other, and are perpendicular to the conductive lines 19a. The conductive lines 19a and the conductive lines 19b are provided to form a lattice which is along and parallel to a shape of the second lattice electrode 14. That is, a lattice of the conductive lines 19a and 19b is provided in such a manner that the conductive lines 19a and 19b are parallel to sides of the shape (square) of the second lattice electrode 14. Here, a pitch of the conductive lines 19a and a pitch of the conductive lines 19b are equal to each other.

A pitch of the conductive lines 22 of the connecting section 18 is different from the pitch of the lattice wires 19a constituting the second lattice electrode 14. The pitch of two conductive lines 22 of the connecting section 18 is smaller than the pitch of the conductive lines 19a constituting the second lattice electrode 14. In this case, one of the conductive lines 22 of the connecting section 18 extends along the conductive line 19a of the second lattice electrode 14 on an upper side of said one of the conductive lines 22 (is aligned with the conductive line 19a), and the other of the conductive lines 22 of the connecting section 18 extends along the conductive line 19a of the second lattice electrode 14 on a lower side of said the other of the conductive lines 22. It should be noted that respective conductive lines 19a of two adjacent second lattice electrodes 14 are not lined up (are not aligned with each other).

The connecting section 18 includes a plurality of conductive lines (sixth conductive lines) 22 and a plurality of conductive lines (eighth conductive lines) 24. The plurality of conductive lines 22 are parallel to the conductive lines 19a. In contrast, the plurality of conductive lines 24 are parallel to the conductive lines 19b. That is, the conductive lines 24 are perpendicular to the conductive lines 22. In the present embodiment, the connecting section 18 includes two conductive lines 22 and two conductive lines 24.

The conductive line 22 located in a right part of the connecting section 18 is not aligned with the conductive line 19a of the second lattice electrode 14, the conductive line 19a being adjacently above the connecting section 18. The conductive line 22 and the conductive line 19a which are not aligned with each other are connected with each other via the conductive line 24 located in an upper part of the connecting section 18. Similarly, the conductive line 22 located in a left part of the connecting section 18 and the conductive line 19a of the second lattice electrode 14, the conductive line 19a being adjacently below the connecting section 18, are connected with each other via the conductive line 24 located in a lower part of the connecting section 18.

The conductive lines 24 of the connecting section 18 are provided at positions which overlap lines on which conductive lines of the first lattice electrode are provided.

The conductive lines 19a and 19b and the conductive lines 22 and 24 are made of, for example, a light-shielding metal with low resistance.

As described above, in the present embodiment, the second lattice electrodes 14 and the conductive lines (lattice wires) 19a and 19b forming the lattice of each of the second lattice electrodes 14 are inclined at a predetermined angle, and adjacent ones of the second lattice electrodes 14 with a gap therebetween are connected with each other via the connecting section 18. In this configuration, in a case where the conductive lines (lattice wires) 19a and 19b forming a lattice are inclined by ±arctan(1/n) to an inclination of 45°, the lattice wires 19a and 19b can be provided at an angle at which moiré is less likely occur. Since m≠n, respective lattice wires 19a of adjacent ones of the second lattice electrodes 14 are not lined up. In this case, by making the pitch of the conductive lines 22 of the connecting section 18 smaller than the pitch of the lattice wires 19a and connecting the conductive lines 22 with the lattice wires 19a via the conductive lines 24 perpendicular to the conductive lines 22 and the lattice wires 19a, it is possible to connect adjacent ones of the second lattice electrodes 14 with each other via at least two sets of the conductive line 22 and the conductive line 24. Accordingly, even when the conductive line 22 and/or the conductive line 24 of one of the two sets of the connecting section 18 are/is broken, electrical connection is maintained via the conductive lines 22 and 24 of the other of the two sets.

(Configuration of Touch Panel Substrate 30)

Figure 14:
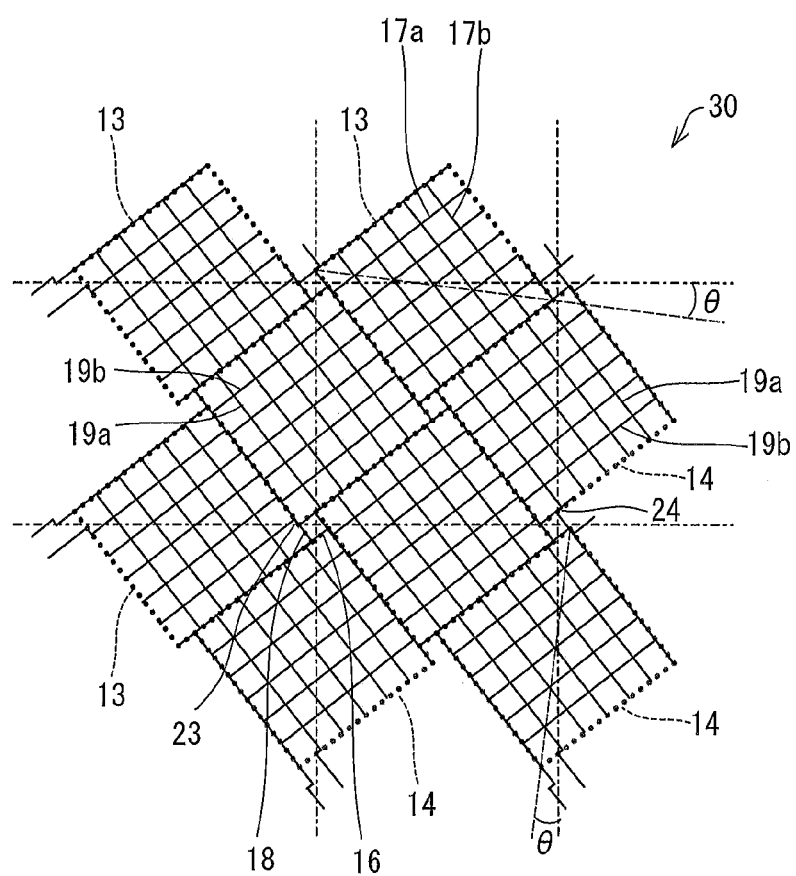
FIG. 14 is a view obtained by overlapping the first detection electrodes in FIG. 11 and the second detection electrodes in FIG. 13, and is a plan view illustrating a configuration of wires of the touch panel substrate.

FIG. 14 is a view obtained by overlapping the first detection electrodes 11 in FIG. 11 and the second detection electrodes 12 in FIG. 13, and is a plan view illustrating a configuration of wires of a touch panel substrate 20 in accordance with the present embodiment.

The conductive lines 17a (lattice wires rising rightward) at one angle which form the lattice of the first lattice electrode 13 are parallel to the conductive lines 19b (lattice wires rising rightward) at one angle which form the lattice of the second lattice electrode 14. The conductive lines 17b (lattice wires falling rightward) at the other angle which form the lattice of the first lattice electrode 13 are parallel to the conductive lines 19a (lattice wires falling rightward) at the other angle which form the lattice of the second lattice electrode 14.

However, the first detection electrodes 11 and the second detection electrodes 12 do not form a uniform lattice pattern. This is because respective lattice wires of the first lattice electrode 13 and the second lattice electrode 14 which are adjacent to each other are not aligned with each other. For example, as for the first lattice electrode 13 and the second lattice electrode 14 which are adjacent to each other in a direction in which the conductive lines 17a extend (third direction), the conductive lines 17a and the conductive lines 19b which are parallel to the conductive lines 17a are not aligned with each other. As for the first lattice electrode 13 and the second lattice electrode 14 which are adjacent to each other in a direction in which the conductive lines 17b extend (fourth direction), the conductive lines 17b and the conductive lines 19a which are parallel to the conductive lines 17b are not aligned with each other.

It should be noted that since the first lattice electrode 13 and the second lattice electrode 14 have the same density of wires, the touch panel substrate 30 has uniform transmittance. The pitch of the conductive lines of the connecting sections 16 and 18 is different from the pitches of the lattice wires 17a, 17b, 19a, and 19b of the first lattice electrode 13 and the second lattice electrode 14. However, the connecting sections 16 and 18 are provided in very small regions in a whole screen and the conductive lines of the connecting sections 16 and 18 and the lattice wires 17a, 17b, 19a, and 19b of the first lattice electrode 13 and the second lattice electrode 14 do not greatly differ in density of wires, so that nonuniformity in transmittance (i.e. brightness) is not recognized.

Furthermore, the conductive line 23 of the connecting section 16 overlaps the conductive line 19a of the second lattice electrode 14, the conductive line 19a being located on an extension of the conductive line 22 of the connecting section 18. The conductive line 24 of the connecting section 18 overlaps the conductive line 17a of the first lattice electrode 13, the conductive line 17a being located on an extension of the conductive line 21 of the connecting section 16.

For example, in a case where the division number m is large and a pitch of a plurality of conductive lines 17a of the first lattice electrode 13 and a plurality of conductive lines 19a of the second lattice electrode 14 are smaller than a pitch of a plurality of conductive lines of the connecting sections 16 and 18, the conductive line 23 of the connecting section 16 overlaps the conductive line 22 of the connecting section 18 and the conductive line 24 of the connecting section 18 overlaps the conductive line 21 of the connecting section 16.

Diagonals of a unit lattice (quadrangle as a minimum unit) of the lattice constituting each of the first lattice electrodes 13 or each of the second lattice electrodes 14 are inclined to both of the direction in which the first detection electrodes 11 extend (lateral direction) and the direction in which the second detection electrodes 12 extend (longitudinal direction). Furthermore, conductive lines of the lattice are also inclined to both of the direction in which the first detection electrodes 11 extend (lateral direction) and the direction in which the second detection electrodes 12 extend (longitudinal direction). One of two diagonals of the lattice is inclined at the angle θ to one of the direction in which the first detection electrodes 11 extend (lateral direction) and the direction in which the second detection electrodes 12 extend (longitudinal direction).

In the present embodiment, the first lattice electrodes 13 and the second lattice electrodes 14 are provided to be inclined together with lattice wires provided therein, and the connecting sections 16 and 18 are provided at a gap (region 15) among the first lattice electrodes 13 and the second lattice electrodes 14. In the touch panel substrate 30, the lattice wires 17a, 17b, 19a, and 19b occupy a large part of the wire pattern. Accordingly, by differentiating the pitch of the conductive lines of the connecting sections 16 and 18 from the pitches of the lattice wires 17a, 17b, 19a, and 19b of the first lattice electrodes 13 and the second lattice electrodes 14, it is possible to enhance a degree of freedom of the pitches of the lattice wires 17a, 17b, 19a, and 19b and a degree of freedom of the angle $\alpha$ of the lattice wires. Consequently, it is possible to set the angle $\alpha$ [$\alpha$=45°±arctan (1/n)] of the lattice wires 17a, 17b, 19a, and 19b so that moiré does not occur. Accordingly, it is possible to prevent occurrence of moiré.

As compared with First Embodiment (FIG. 5), the touch panel substrate 30 in accordance with the present embodiment is smaller in region where a pitch of wires is small (region corresponding to the connecting section). Furthermore, the touch panel substrate 30 is larger in region with uniform density of wires than the touch panel substrate 2 in accordance with First Embodiment (FIG. 5). Accordingly, the touch panel substrate 30 has uniform transmittance and can further prevent occurrence of moiré.

[Summary]

A touch panel substrate in accordance with one aspect of the present invention includes: a first detection electrode including a plurality of first lattice electrodes aligned in a first direction; and a second detection electrode including a plurality of second lattice electrodes aligned in a second direction different from the first direction, in a plan view, the plurality of first lattice electrodes being provided in regions different from regions where the plurality of second lattice electrodes are provided, the plurality of first lattice electrodes each including a plurality of first conductive lines parallel to a third direction and a plurality of second conductive lines parallel to a fourth direction different from the third direction, the plurality of first conductive lines and the plurality of second conductive lines forming a lattice, the third direction being inclined to the first direction at an angle of $\alpha$ that is larger than 0° and smaller than 45°, the plurality of second lattice electrodes each including a plurality of third conductive lines parallel to the third direction and a plurality of fourth conductive lines parallel to the fourth direction, the plurality of third conductive lines and the plurality of fourth conductive lines forming a lattice, adjacent ones of the plurality of first lattice electrodes in the first direction being electrically connected with each other via a first connecting section positioned between the adjacent ones of the plurality of first lattice electrodes, the first connecting section including a plurality of fifth conductive lines parallel to the third direction, the plurality of fifth conductive lines having a pitch that is smaller than a pitch of the plurality of first conductive lines, adjacent ones of the plurality of second lattice electrodes in the second direction being electrically connected with each other via a second connecting section positioned between the adjacent ones of the plurality of second lattice electrodes, the second connecting section including a plurality of sixth conductive lines parallel to the fourth direction, and the plurality of sixth conductive lines having a pitch that is smaller than a pitch of the plurality of fourth conductive lines.

With the arrangement, the plurality of conductive lines forming the lattice of each of the first lattice electrodes and the second lattice electrodes are inclined at the angle $\alpha$, so that the plurality of conductive lines are provided at an angle at which moiré is less likely to occur. Furthermore, by making the pitch of the plurality of conductive lines of the connecting section smaller than the pitch of the conductive lines forming the lattice, it is possible to connect adjacent ones of the first lattice electrodes (and adjacent ones of the second lattice electrodes) with each other via at least two conductive lines. Consequently, even when one of the conductive lines of the connecting section is broken, electric connection between the adjacent ones of the first lattice electrodes is maintained via another one of the conductive lines of the connecting section. Besides, the first detection electrode extends in the first direction and the second detection electrode extends in the second direction. Accordingly, it is possible to subdue moiré so as to enhance display quality and can appropriately detect a position where a target object touches.

The touch panel substrate may be arranged such that the pitch of the plurality of first conductive lines, a pitch of the plurality of second conductive lines, a pitch of the plurality of third conductive lines, and the pitch of the plurality of fourth conductive lines are equal to one another, and the pitch of the plurality of fifth conductive lines and the pitch of the plurality of sixth conductive lines are equal to each other.

The touch panel substrate may be arranged such that the plurality of first conductive lines of each of the plurality of first lattice electrodes are not aligned with the plurality of third conductive lines of one of the plurality of second lattice electrodes which one is adjacent in the third direction to said each of the plurality of first lattice electrodes, and the plurality of second conductive lines of each of the plurality of first lattice electrodes are not aligned with the plurality of fourth conductive lines of one of the plurality of second lattice electrodes which one is adjacent in the fourth direction to said each of the plurality of first lattice electrodes.

The touch panel substrate may be arranged such that 45°−arctan(½)<$\alpha$<45°.

The touch panel substrate may be arranged such that 45°−arctan(⅙)≤$\alpha$≤45°−arctan(⅛).

The touch panel substrate may be arranged such that the pitch of the plurality of fifth conductive lines is larger than a half of the pitch of the plurality of first conductive lines, and the pitch of the plurality of sixth conductive lines is larger than a half of the pitch of the plurality of fourth conductive lines.

The touch panel substrate may be arranged such that the plurality of first lattice electrodes each further include a plurality of seventh conductive lines parallel to the third direction, and the plurality of seventh conductive lines are provided at a pitch equal to the pitch of the plurality of fifth conductive lines and are aligned with the plurality of fifth conductive lines.

The touch panel substrate may be arranged such that the first connecting section further includes an eighth conductive line which overlaps one of the plurality of fourth conductive lines or one of the plurality of sixth conductive lines in a plan view, and the eighth conductive line connects one of the plurality of first conductive lines with one of the plurality of fifth conductive lines, said one of the plurality of first conductive lines and said one of the plurality of fifth conductive lines being not aligned with each other.

The touch panel substrate may be arranged such that the first direction and the second direction are orthogonal to each other.

The touch panel substrate may be arranged such that the third direction and the fourth direction are orthogonal to each other.

The touch panel substrate may be arranged such that the plurality of first lattice electrodes and the plurality of second lattice electrodes each have a square shape.

The touch panel substrate may be arranged such that the first detection electrode and the first connecting section are provided in a first layer, and the second detection electrode and the second connecting section are provided in a second layer different from the first layer.

A display device in accordance with one aspect of the present invention includes: the touch panel substrate; and a display panel.

The display device may be arranged such that a lattice of a black matrix provided in the display panel includes (i) strips extending in one direction parallel to the first direction and (ii) strips extending in another direction parallel to the second direction.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be used for a display device having a touch panel function.

REFERENCE SIGNS LIST

1 Display device
2, 20, 30 Touch panel substrate
3 Display panel
4 Backlight
5 Substrate
6 First electrode layer
7 Second electrode layer
8 First protective layer
9 Second protective layer
10 Black matrix
11 First detection electrode
12 Second detection electrode
13 First lattice electrode
14 Second lattice electrode
15 Region
16 Connecting section (first connecting section)
17a, 17b, 17c Conductive lines (first conductive lines, second conductive lines, seventh conductive lines)
18 Connecting section (second connecting section)
19a, 19b, 19c Conductive lines (third conductive lines, fourth conductive lines, seventh conductive lines)
21 Conductive lines (fifth conductive lines)
22 Conductive lines (sixth conductive lines)
23, 24 Conductive lines (eighth conductive lines)

The invention claimed is:

1. A touch panel substrate, comprising:
a plurality of first detection electrodes aligned in a first direction; and
a plurality of second detection electrodes aligned in a second direction different from the first direction, wherein
in a plan view, the plurality of first detection electrodes are provided in regions different from regions where the plurality of second detection electrodes are provided,
the plurality of first detection electrodes each include a plurality of first conductive lines parallel to a third direction and a plurality of second conductive lines parallel to a fourth direction different from the third direction,
the third direction is inclined to the first direction at an angle of α that is larger than 0° and smaller than 45°,
the plurality of second detection electrodes each include a plurality of third conductive lines parallel to the third direction and a plurality of fourth conductive lines parallel to the fourth direction,
adjacent ones of the plurality of first detection electrodes in the first direction are electrically connected with each other via a first connecting section positioned between the adjacent ones of the plurality of first detection electrodes,
the first connecting section includes a plurality of fifth conductive lines parallel to the third direction,
the plurality of fifth conductive lines have a pitch that is smaller than a pitch of the plurality of first conductive lines,
adjacent ones of the plurality of second detection electrodes in the second direction are electrically connected with each other via a second connecting section positioned between the adjacent ones of the plurality of second detection electrodes,
the second connecting section includes a plurality of sixth conductive lines parallel to the fourth direction,
the plurality of sixth conductive lines have a pitch that is smaller than a pitch of the plurality of fourth conductive lines,
one of the plurality of fifth conductive lines and one of the plurality of first conductive lines are electrically connected with each other via an eighth conductive line which is not parallel to the third direction, the one of the plurality of fifth conductive lines and the one of the plurality of first conductive lines being parallel to each other, and
one of the plurality of sixth conductive lines and one of the plurality of fourth conductive lines are electrically connected with each other via a ninth conductive line which is not parallel to the fourth direction, the one of the plurality of sixth conductive lines and the one of the plurality of fourth conductive lines being parallel to each other.

2. The touch panel substrate as set forth in claim 1, wherein
the pitch of the plurality of first conductive lines, a pitch of the plurality of second conductive lines, a pitch of the plurality of third conductive lines, and the pitch of the plurality of fourth conductive lines are equal to one another, and
the pitch of the plurality of fifth conductive lines and the pitch of the plurality of sixth conductive lines are equal to each other.

3. The touch panel substrate as set forth in claim 1, wherein
the plurality of first conductive lines of each of the plurality of first detection electrodes are not aligned with the plurality of third conductive lines of one of the plurality of second detection electrodes which one is adjacent in the third direction to said each of the plurality of first detection electrodes, and the plurality of second conductive lines of each of the plurality of first detection electrodes are not aligned with the plurality of fourth conductive lines of one of the plurality of second detection electrodes which one is adjacent in the fourth direction to said each of the plurality of first detection electrodes.

4. The touch panel substrate as set forth in claim 1, wherein $45°-\arctan(½)<α<45°$.

5. The touch panel substrate as set forth in claim 1, wherein $45°-\arctan(⅙)≤α≤45°-\arctan(⅛)$.

6. The touch panel substrate as set forth in claim 1, wherein
the pitch of the plurality of fifth conductive lines is larger than a half of the pitch of the plurality of first conductive lines, and
the pitch of the plurality of sixth conductive lines is larger than a half of the pitch of the plurality of fourth conductive lines.

7. The touch panel substrate as set forth in claim 1, wherein
the plurality of first detection electrodes each further include a plurality of seventh conductive lines parallel to the third direction, and
the plurality of seventh conductive lines are provided at a pitch equal to the pitch of the plurality of fifth conductive lines and are aligned with the plurality of fifth conductive lines.

8. The touch panel substrate as set forth in claim 1, wherein
the eighth conductive line is included in the first connecting section, and
the eighth conductive line overlaps one of the plurality of fourth conductive lines or one of the plurality of sixth conductive lines in a plan view.

9. The touch panel substrate as set forth in claim 1, wherein the first direction and the second direction are orthogonal to each other.

10. The touch panel substrate as set forth in claim 9, wherein the third direction and the fourth direction are orthogonal to each other.

11. The touch panel substrate as set forth in claim 1, wherein the plurality of first detection electrodes and the plurality of second detection electrodes each have a square shape.

12. The touch panel substrate as set forth in claim 1, wherein
the first detection electrode and the first connecting section are provided in a first layer, and
the second detection electrode and the second connecting section are provided in a second layer different from the first layer.

13. A display device, comprising:
a touch panel substrate as set forth in claim 1; and
a display panel.

14. The display device as set forth in claim 13, wherein a detection of a black matrix provided in the display panel includes (i) strips extending in one direction parallel to the first direction and (ii) strips extending in another direction parallel to the second direction.

* * * * *